(12) United States Patent
Bobel

(10) Patent No.: US 8,035,318 B2
(45) Date of Patent: Oct. 11, 2011

(54) APPARATUS AND METHOD ENABLING FULLY DIMMABLE OPERATION OF A COMPACT FLUORESCENT LAMP

(75) Inventor: Andrzej Bobel, Lake Forest, IL (US)

(73) Assignee: Neptun Light, Inc., Lake Bluff, IL (US)

( * ) Notice: Subject to any disclaimer, the term of this patent is extended or adjusted under 35 U.S.C. 154(b) by 472 days.

(21) Appl. No.: 12/165,347

(22) Filed: Jun. 30, 2008

(65) Prior Publication Data

US 2009/0322237 A1 Dec. 31, 2009

(51) Int. Cl.
*H05B 41/36* (2006.01)
*G05F 37/02* (2006.01)

(52) U.S. Cl. ........................ 315/307; 315/291

(58) Field of Classification Search .................. 315/291, 315/307, 209 R, 244, 246
See application file for complete search history.

(56) References Cited

U.S. PATENT DOCUMENTS

| | | |
|---|---|---|
| 4,109,307 A | 8/1978 | Knoll |
| 4,188,660 A | 2/1980 | Knoll |
| 4,222,096 A | 9/1980 | Capewell |
| 4,352,045 A | 9/1982 | Widmayer |
| 4,392,087 A | 7/1983 | Zansky |
| 4,808,887 A | 2/1989 | Fahnrich |
| 4,862,041 A | 8/1989 | Hirschmann |
| 4,928,038 A | 5/1990 | Nerone |
| 4,985,664 A | 1/1991 | Nilssen |
| 5,001,400 A | 3/1991 | Nilssen |
| 5,003,231 A | 3/1991 | Perper |
| 5,010,277 A | 4/1991 | Courier de Mere |
| 5,041,766 A | 8/1991 | Fiene et al. |
| 5,057,749 A | 10/1991 | Nilssen |
| 5,099,407 A | 3/1992 | Thorne |
| 5,115,347 A | 5/1992 | Nilssen |
| 5,180,950 A | 1/1993 | Nilssen |
| 5,223,767 A | 6/1993 | Kulka |
| 5,251,119 A | 10/1993 | Maehara |
| 5,313,142 A | 5/1994 | Wong |
| 5,371,438 A | 12/1994 | Bobel |
| 5,404,082 A | 4/1995 | Hernandez et al. |
| 5,434,480 A | 7/1995 | Bobel |
| 5,448,137 A | 9/1995 | Bobel |
| 5,608,295 A | 3/1997 | Moisin |
| 5,801,492 A | 9/1998 | Bobel |
| 5,914,572 A * | 6/1999 | Qian et al. .................... 315/307 |
| 5,945,783 A * | 8/1999 | Schultz et al. ................ 315/219 |
| 5,994,848 A | 11/1999 | Janczak |
| 6,002,210 A | 12/1999 | Nilssen |
| 6,011,357 A | 1/2000 | Gradzki |
| 6,100,645 A * | 8/2000 | Moisin ......................... 315/224 |
| 6,100,648 A | 8/2000 | Moisin |
| 6,144,169 A | 11/2000 | Janczak |
| 6,172,464 B1 | 1/2001 | Nilssen |
| 6,304,041 B1 * | 10/2001 | Farkas et al. .................. 315/291 |
| 6,448,713 B1 * | 9/2002 | Farkas et al. .................. 315/291 |
| 6,452,343 B2 | 9/2002 | Oostvogels et al. |
| 6,545,431 B2 | 4/2003 | Hui et al. |
| 6,661,185 B2 | 12/2003 | Kominami et al. |
| 7,061,781 B2 * | 6/2006 | Heckmann et al. ............ 363/81 |

* cited by examiner

*Primary Examiner* — Douglas W Owens
*Assistant Examiner* — Minh D A
(74) *Attorney, Agent, or Firm* — Wall & Tong, LLP

(57) ABSTRACT

An electronic ballast circuit and related method for enabling full range dimming of a gas discharge load such as a compact fluorescent lamp.

17 Claims, 19 Drawing Sheets

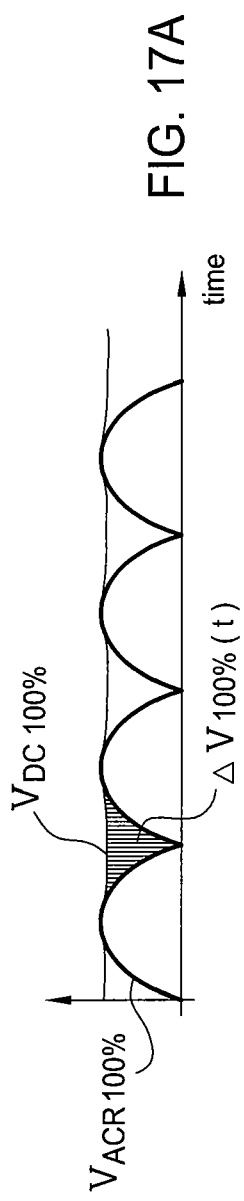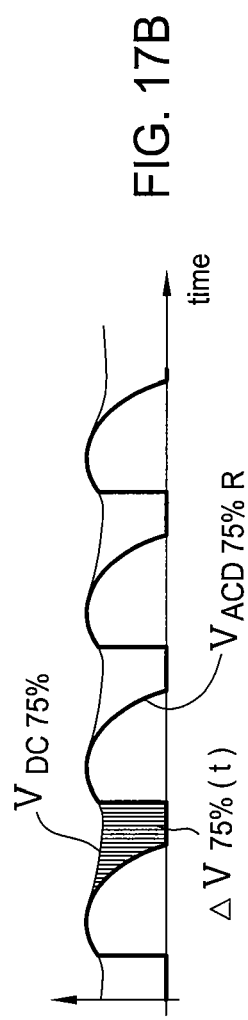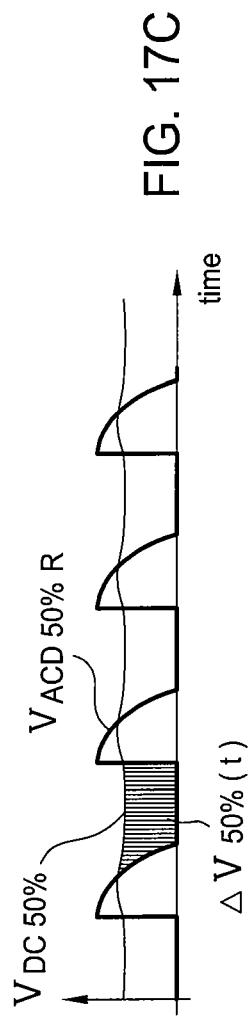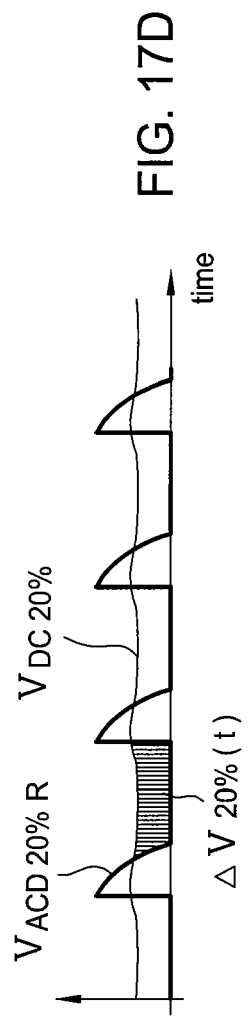

US 8,035,318 B2

APPARATUS AND METHOD ENABLING FULLY DIMMABLE OPERATION OF A COMPACT FLUORESCENT LAMP

FIELD OF THE INVENTION

The present invention relates to electronic lighting systems and, more particularly, to methods and apparatus capable of supplying, at the output, a load such as compact fluorescent lamps and other gas discharge lamps.

BACKGROUND

Recent advances have yielded new and improved fluorescent light sources that effectively compete with incandescent and tungsten-halogen light sources and bulbs. Recent advances in electronic ballasts have yielded smaller and more reliable ballasts for use in lighting applications.

When designed for use with phase controlling triac type dimmers, an electronic ballast circuit must satisfy the requirements of the triac related to holding current requirements. The triac, when in its conducting state, must have the current magnitude above a minimum holding current to conduct current without undesired interruptions during the time of each half cycle of the AC power line voltage supply. Otherwise, the operation will result in undesired lamp flickering.

Compact fluorescent lamps (combined fluorescent lamp and electronic ballast) intended for operation from an ordinary AC power line typically include a full-wave rectifier, an energy storage capacitor, a high frequency inverter made with switching transistors and supplied by the energy storage capacitor, and a resonant circuit to start and operate the gas discharge lamp as the light source.

Prior art arrangements typically comprise a single stage electronic ballast with high power factor and with lower harmonic distortion of the current drawn from the AC power line that incorporate energy feedback from the output of the ballasts to the input. The feedback of energy from the output to the input as used in prior art products is designed in such a way to either satisfy the requirement of a triac holding current or to satisfy the full dimming range without visible flicker. The visible flicker is related to a ripple voltage present at the storage capacitor. The voltage ripple should be kept at minimum at all dimming levels. The light dimming range of the lamp and its relation to dimmer range is the result of the energy feedback, as well. The energy feedback is not self-adjustable and, in fact, provides increased energy feedback from the output to the input while dimming function is performed. This leads to undesired drop of frequency of operation of the self-oscillating inverter and create dangerous situation when the resonant circuit will have a capacitive impedance character which leads to destructive cross conduction of the of the switching transistors.

Unfortunately, numerous attempts have been made without success to develop an electronic ballast or other mechanism to enable fully dimmable compact fluorescent lamp operation.

BRIEF SUMMARY

Various deficiencies of the prior art are addressed by the present invention of a method and apparatus enabling a fully dimmable compact fluorescent lamp.

Specifically, in one embodiment an apparatus for powering a gas discharge load comprises a bridge rectifier, for generating a rectified voltage signal across a pair of output terminals in response to a received AC signal; a storage capacitor, coupled across the bridge rectifier output terminals, for storing energy provided by the rectified voltage signal; an inverter, coupled across the bridge rectifier, for generating an alternating voltage signal at an output terminal; an inductor, coupled between the inverter output terminal and a load terminal; a first resonant circuit including the inductor, for providing a DC feedback signal to the storage capacitor, the DC feedback signal being AC clamped to the received AC signal; and a second resonant circuit including the inductor, for supplying a load current to the load terminal; wherein the first resonant circuit adapts the DC feedback signal in response to changes in the received AC signal.

In a further embodiment, the first resonant circuit further comprises a DC feedback capacitor, for providing a charging voltage to the storage capacitor; a smaller AC clamping capacitor for providing a high voltage to the bridge rectifier input during a relatively high frequency resonant oscillation mode; and a larger AC clamping capacitor for providing a high current to the bridge rectifier input during the relatively high frequency resonant oscillation mode.

BRIEF DESCRIPTION OF THE DRAWINGS

The teachings of the present invention can be readily understood by considering the following detailed description in conjunction with the accompanying drawings, in which:

FIGS. 16-17 depicts a graphical representations of voltage waveforms useful in understanding the various embodiments.

To facilitate understanding, identical reference numerals have been used, where possible, to designate identical elements that are common to the figures.

DETAILED DESCRIPTION OF THE INVENTION

The inventor has determined that full dimming of compact fluorescent lamps may be obtained where several conditions are met. First, a desired energy feedback shall be self-adjusting in proportion to the dimming level set by the triac dimmer to achieve dimming without visible flicker and dimming range of the lamp always proportional to the triac dimmer range. In other words, the light output during the dimming mode should be reduced to it lowest setting before the entire range of the dimmer is used. This requirement is particularly important in view of the fact that without the self-adjustment function of the feedback energy, the inverter and the resonant circuit are overstressed during the dimming mode by undesirable increase magnitude of a circulating resonant current within the inverter and the resonant circuit.

Another fundamental requirement of fully dimmable compact fluorescent lamps is the requirement of control of the impedance character of the resonant circuit to be inductive at all times: (i) at power up of the lamp in very low and very high ambient temperatures and at any dimmer setting: at full, at lowest or any in between, and (ii) during dimming at very cold and very hot ambient temperatures. This control of the impedance character is achieved by control of operation frequency of the inverter to be self-increasing while the dimming function is performed by the triac dimmer.

In order to satisfy long life requirement of the fully dimmable compact fluorescent lamps made with heatable filaments as the discharge current emitters, the amount of heat energy supplied to the filaments must be increased in reverse proportion to dimming level. When the light output of the lamp is decreasing by performing the dimming function with use of triac dimmer, the filament voltage applied to the filaments and current thru the filaments, must increase proportionally.

Figure 1:
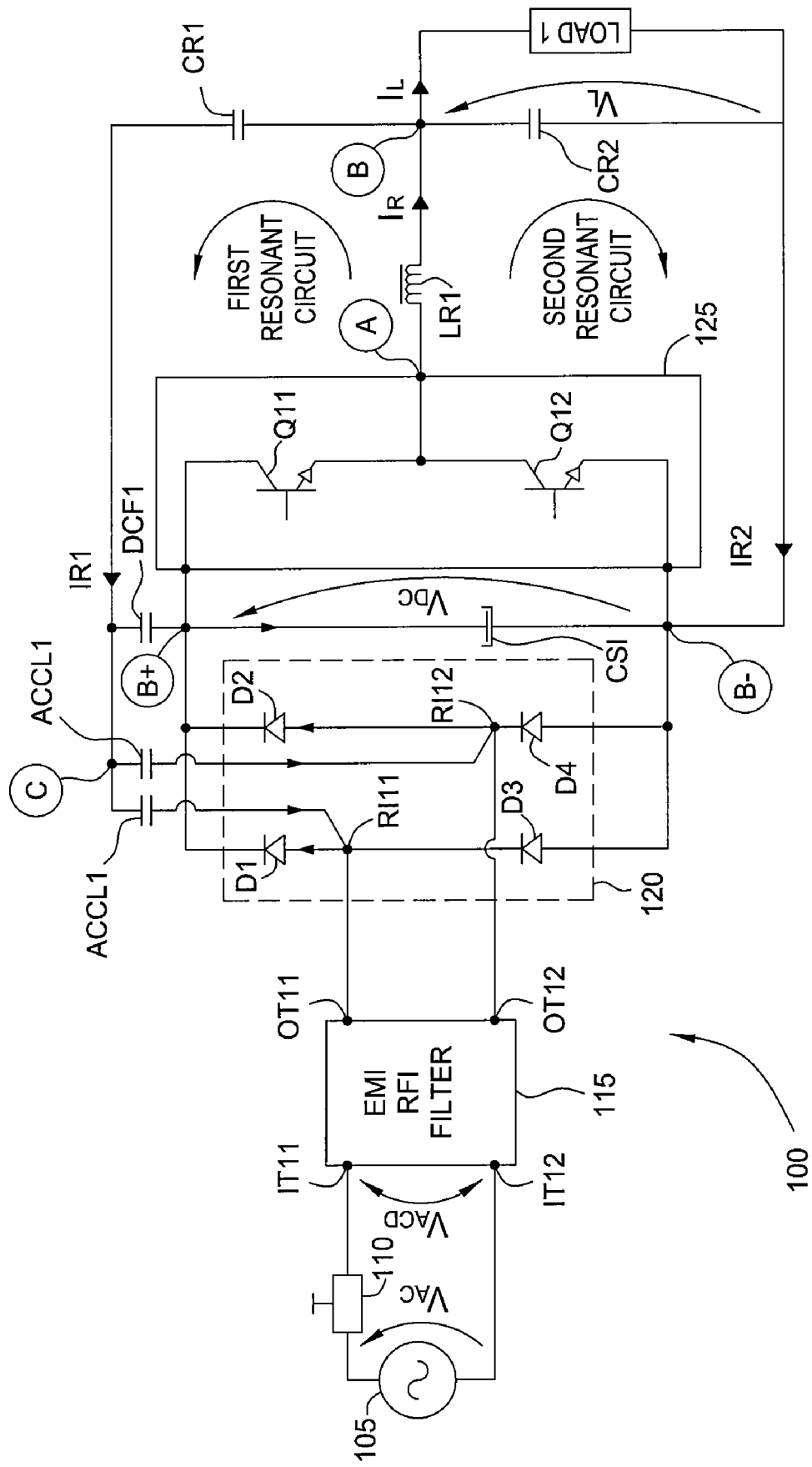
FIG. 1 depicts a block diagram of a circuit including an electronic ballast according to one embodiment.

FIG. 1 depicts a block diagram of a circuit including an electronic ballast according to one embodiment. Specifically, electronic ballast 100 receives AC power from a conventional AC power line 105 via a dimmer 110 and converts the AC power into a controlled current $I_L$ for use by, illustratively, a gas discharge load such as a fluorescent light source equipped with heatable filaments or an electrodeless fluorescent light source.

The electronic ballast 100 comprises an EMI/RFI filter 115, a full wave bridge rectifier 120, and half-bridge inverter 125 and various circuit components configured to form first and second resonant circuits.

The conventional AC power line 105 (an ordinary alternating current source such as, illustratively, a North American 120 Volt/60 Hz or other conventional electric utility power line) is connected through a DIMMER to a pair of input terminals IT11 and IT12 of EMI/RFI filter 115. The EMI/RFI filter 115 has a pair of output terminals OT11 and OT12 connected to a pair of input terminals RI11 and RI12 of the full wave bridge rectifier 120. The EMI/RFI filter 115 operates to reduce high frequency noise and other spurious signal components present in the AC input power to deliver a relatively clean AC signal to the full wave bridge rectifier 120.

The full wave bridge rectifier 120 comprises a plurality of diodes D1, D2, D3 and D4. The full wave bridge rectifier 120 receives the AC signal from the EMI/RFI filter 115 at input terminals RI11 and RI12 and responsively produces a rectified voltage signal at output terminals B+ and B−. A storage capacitor CS1 is connected across terminals B+ and B−.

The half-bridge inverter 125 comprises, illustratively, a pair of NPN type switching transistors Q11 and Q12 interconnected at a junction A. The collector of Q11 is connected to the positive DC input terminal B+, the emitter of Q11 is connected to the collector of Q12 (denoted as junction A), the emitter of Q12 is connected to the negative DC input terminal B−. The base drive for the transistors Q11 and Q12 circuitry is not shown.

A resonant inductor LR1 is connected to the junction A of the inverter 125 and an output load terminal (denoted as junction B). The junction B is the interconnection point of resonant capacitor CR1, resonant capacitor CR2 and the load LOAD 1, illustratively a gas discharge load. The resonant inductor LR1, the resonant capacitor CR2, and the load form a second resonant circuit with the gas discharge load effectively connected in parallel with capacitor CR2.

A DC feedback capacitor DCF1 connected between resonant capacitor CR1 at a junction C (i.e., the side of CR1 not connected to junction B) and the DC input terminal B+. Further, two AC clamping capacitors ACCL1 and ACCL2 are connected between junction C and to the rectifier input terminals RI11 and RI12, respectively.

Figure 12:
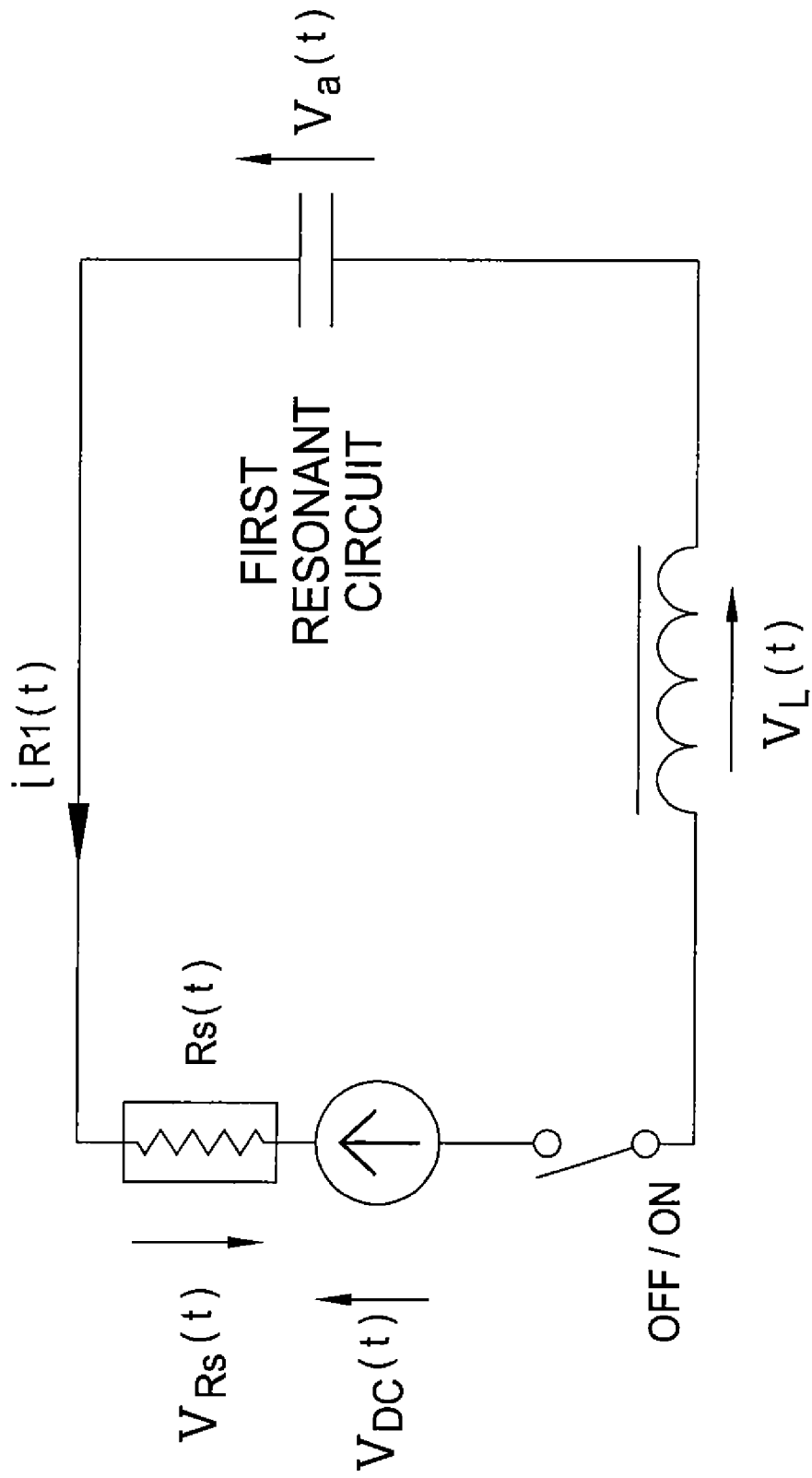
FIG. 12 depicts a block diagram of a first resonant circuit according to an embodiment.

The resonant inductor LR1, the resonant capacitor CR1, and a complex load Rs(t), as shown in a model circuit as per FIG. 12, is made of the following elements: (i) the DC feedback capacitor DCF1; (ii) AC clamping capacitors ACCL1, ACCL2; (iii) diodes D1, D2; and (iv) the storage capacitor CS1.

The storage capacitor, if an electrolytic type is used, has its complex internal impedance made of an internal resistance, an internal equivalent inductance, and an internal capacitance, as is known for those skilled in the art.

FIG. 12 depicts a block diagram representing a model of a first resonant circuit according to an embodiment. Specifically, the first resonant circuit model depicts an RLC resonant circuit in which the following elements are connected in series to produce a current $i_{R1}(t)$ in a resonant operating mode: a source $V_{DC}(t)$, a switch, a complex resistive component $R_s(t)$, an inductive component $V_L(t)$ and a capacitive component $V_L(t)$.

Figure 13:
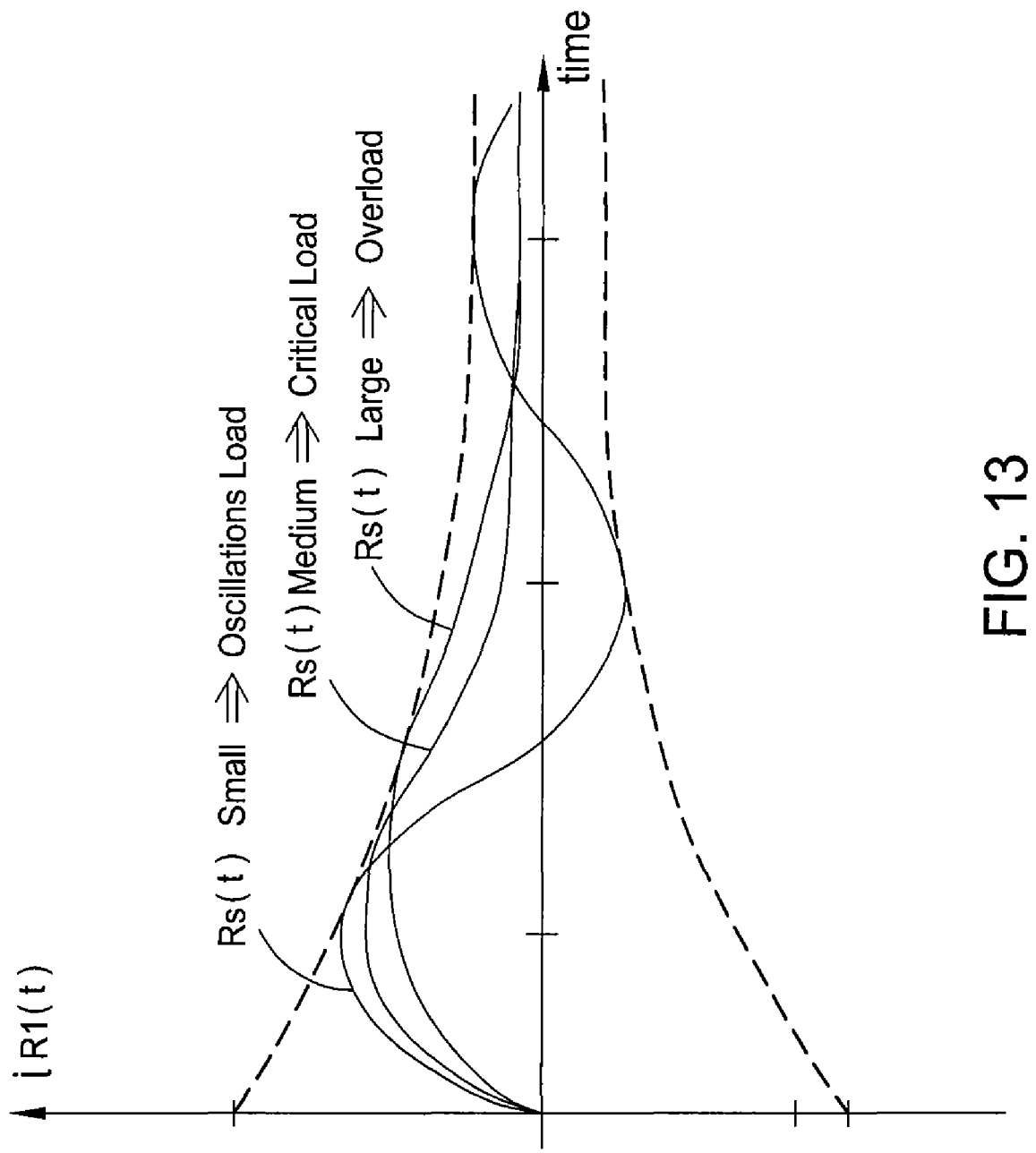
FIG. 13 depicts a graphical representation of current as a function of time useful in understanding the embodiment of FIG. 12.

FIG. 13 depicts a graphical representation of current as a function of time useful in understanding the embodiment of FIG. 12. Specifically, FIG. 13 depicts the current $i_{R1}(t)$ for different resistive loads $R_s(t)$, including small (oscillating load), medium (critical load) and large (over load) conditions.

Figure 14:
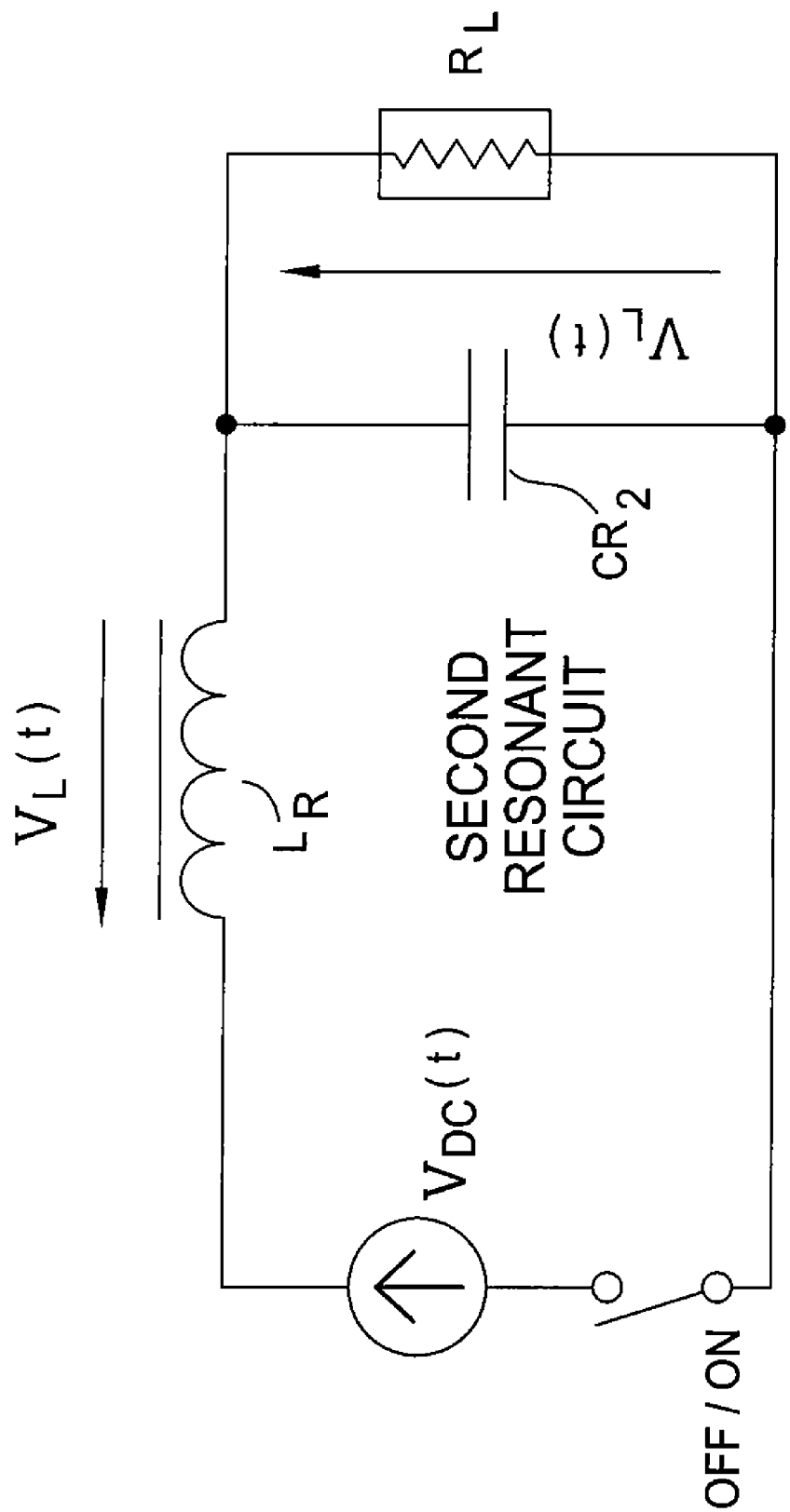
FIG. 14 depicts a block diagram of a second resonant circuit according to an embodiment.

FIG. 14 depicts a block diagram representing a model of a second resonant circuit according to an embodiment. Specifically, the second resonant circuit model depicts an RLC resonant circuit in which the following elements are connected in series to produce an inductor voltage drop $V_L(t)$ in a resonant operating mode: a source $V_{DC}(t)$, a switch, an inductive component $V_L(t)$ and the parallel combination of a capacitive component $V_L(t)$ and a resistive component $R_s(t)$, where the capacitive component represents CR2 and the resistive component represent a gas discharge load resistance $R_L$.

Figure 15:
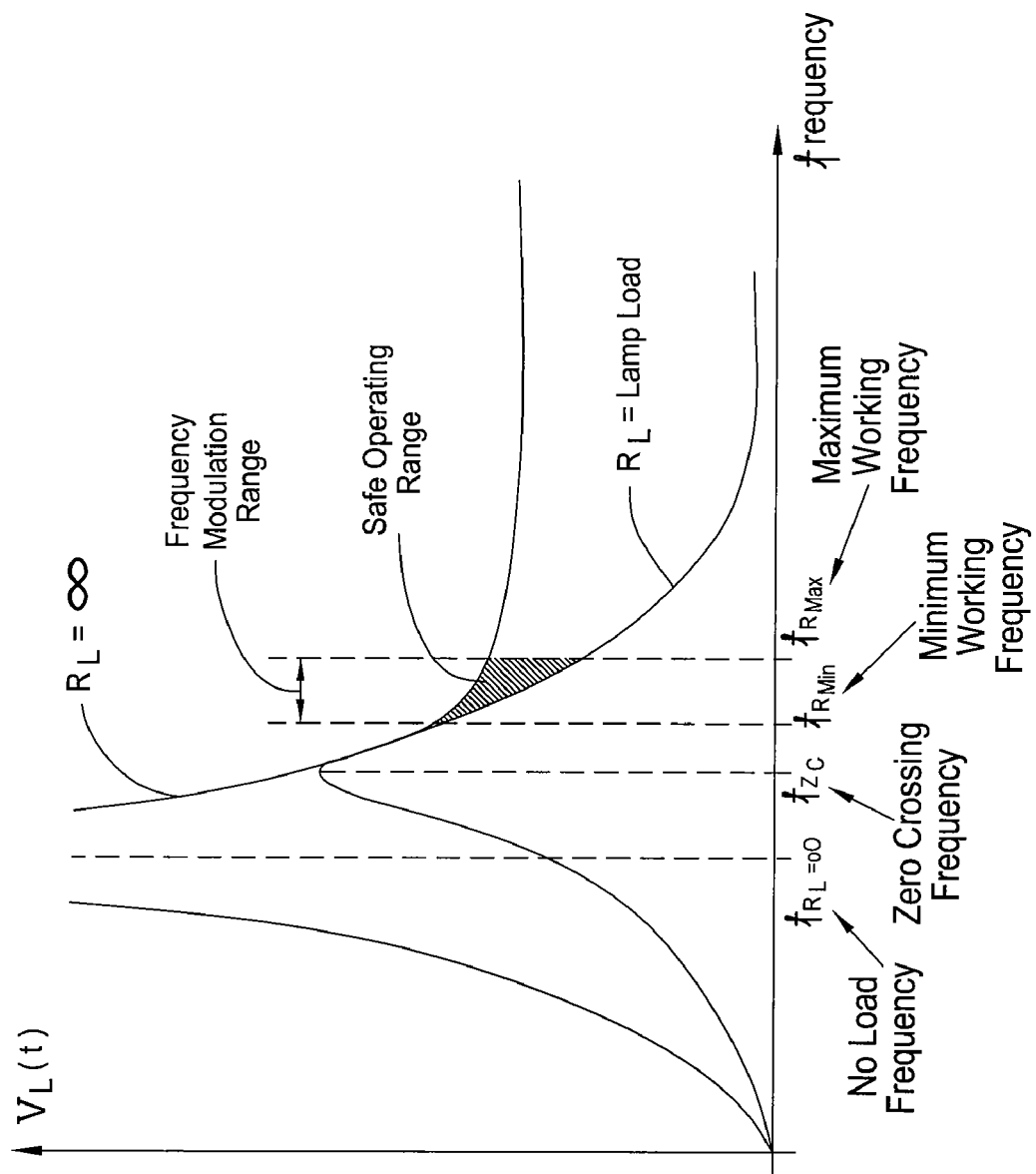
FIG. 15 depicts a graphical representation of current as a function of time useful in understanding the embodiment of FIG. 14.

FIG. 15 depicts a graphical representation of voltage as a function of frequency useful in understanding the embodiment of FIG. 13. Specifically, FIG. 13 depicts the inductor LR with a voltage drop VL(t) for different values of RL, including open circuit and normal lamp load. It can be seen by inspection that the normal lamp load curve peaks at a zero crossing frequency fZC, and that a safe operating region is bounded by minimum fRmin and maximum fRmax working frequencies. Component selection of the various resistor, capacitor and inductor values discussed herein is selected to support operation within the safe operating region.

Figure 18B:
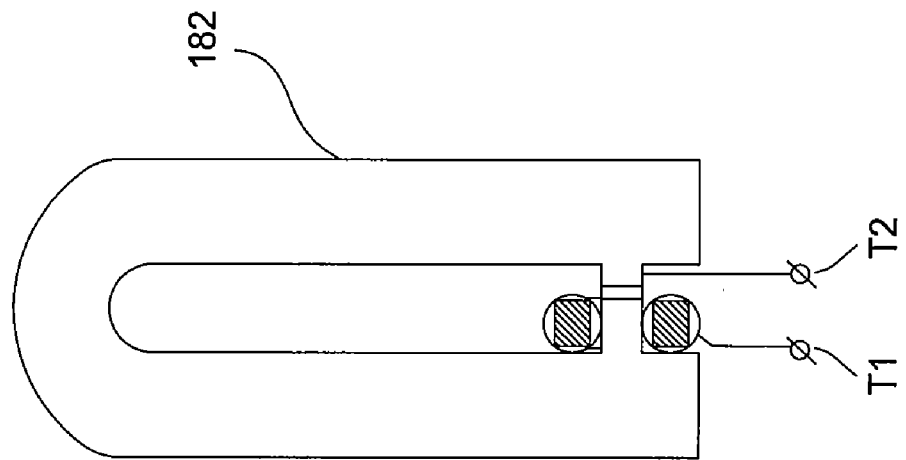
FIG. 18 depicts embodiments of electrodeless gas discharge light sources.
Figure 18A:
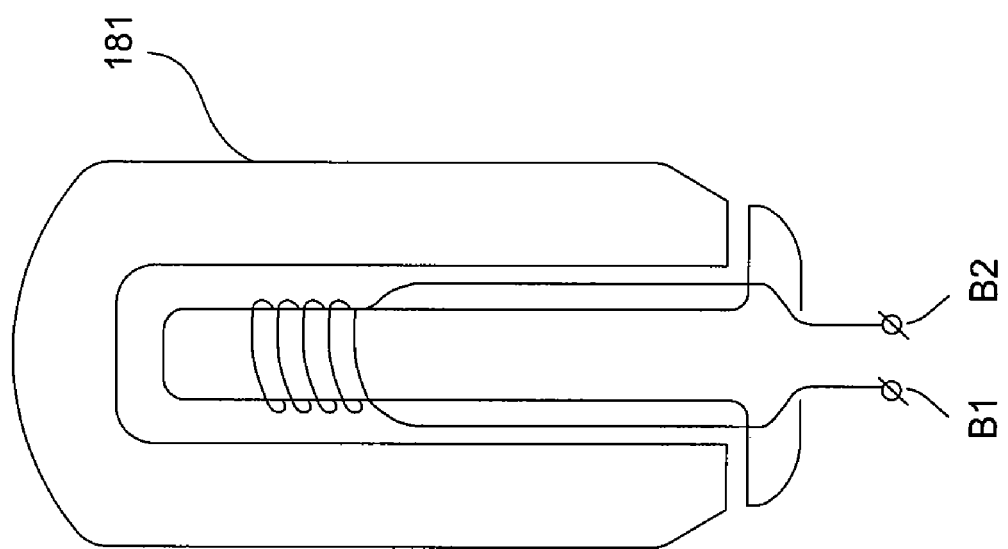

FIG. 18 depicts embodiments of electrodeless gas discharge light sources. Specifically, FIG. 18A depicts an electrodeless bulb type induction light source, while FIG. 18B depicts a bent and bridged tubular type electrodeless light source. Both types of electrodeless light sources may be used within the context of the various embodiments discussed herein.

Operating Characteristics

The operating characteristics of the circuit depicted in FIG. 1 will now be described within the context of steady state operation of the circuit at each of several dimmer positions. Moreover, graphical representations of waveforms as depicted in FIGS. 16-17 will be used to help illustrate the operating characteristics. Specifically, FIG. 16 depicts a plurality of waveforms (i.e., voltage as a function of time) illustrating the AC voltage supplied to the EMI/RFI filter (denoted as VAC) and the DC voltage across storage capacitor CS one (denoted as VDC). FIG. 17 depicts a plurality of waveforms illustrating the rectified AC voltage at the output of the full wave bridge rectifier 120 (denoted as VACR). It can be seen by inspection that the operation of the dimmer in allowing transfer of 100% (dimmer short-circuit), 75%, 50% and 20% of the AC power results in specific changes to the rectified voltage levels, instantaneous voltage differences, regions of oscillation and other parameters.

Figure 16A:
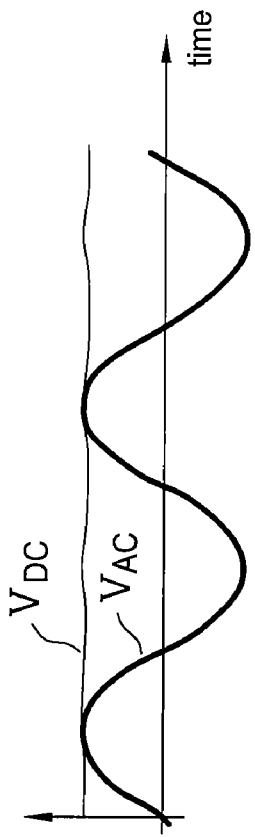

Full Power Mode—100% (Dimmer Shorted):

In this mode of operation, the AC power line supplies a relatively sinusoidal AC voltage as depicted by the waveform VAC, and the voltage across storage capacitor CS1 as depicted by the waveform VDC; both waveforms being depicted in FIG. 16A.

The rectified AC voltage at the output of the full wave bridge rectifier 120 is shown as waveform VACR in FIG. 17A. The instantaneous voltage difference between the VDC100% and VACR100% is shown as ΔV100% (t), which has its amplitude modulated from "zero"-to-"max=VDC100%"-to-"zero" in every half cycle of the AC power line voltage. That ΔV100% voltage at is being added to the VACR100% in a dynamic way by operation of the circuit of this invention.

The circuit starts oscillation by, illustratively, a triggering event provided via any of a number of known techniques. For example, the circuit of FIG. 2 includes a standard triggering mechanism using a diac. Other triggering mechanism are known and useful within the context of the various embodiments.

The first resonant circuit provides DC feedback and AC clamping. However, since the first and second resonant circuits share a common inductor LR1, any change in first resonant circuit current flow (e.g., due to feedback/clamping effects) is reflected in the second resonant circuit current. Specifically, a first portion of the current through LR1 provides power to the load as part of the second resonant circuit, while the remaining portion of the current through LR1 passes through the first resonant circuit.

The first resonant circuit produces resonant current IR1 of certain magnitude that is dependent on a complex load resistance Rs(t), as illustrated in FIG. 12. The IR1 current, which passes through DC feedback capacitor DCF1 and a pair of clamping capacitors ACCL1 and ACCL2, provides additional current to charge the storage capacitor CS1 toward the peak magnitude of the rectified voltage VACR100%.

To cause the circuit to operate as a high power factor device (with P.F. 0.7-0.9), the clamping capacitors ACCL1 and ACCL2 are selected to have values with an approximate ratio range from 470 nF:0.5 nF to 330 nF:10 nF. One ratio of interest is 390 nF:10 nF. Generally speaking, the large value clamping capacitor has a capacitance within a range of about 200 nF to 600 nf, while the small value clamping capacitor has a capacitance within a range of about 0.2 nF to 20 nF. The ratio of capacitance between the large and small value capacitors is within a range of about 20:1 to 2000:1. This large difference in capacitance values of the two clamping capacitors enables each capacitor to perform a specific function in charging an electrolytic capacitor to its maximum voltage. The small value clamping capacitor charges and discharges faster during the high frequency cycle of resonant oscillations, thus providing the function of a high voltage source. The large value clamping capacitor charges and discharges slower during the high frequency cycle of resonant oscillations, thus providing the function of high current source.

The effect of this feedback and clamping arrangement of the capacitors is that the voltage Vc(t) developed at the resonant capacitor CR1 is dynamically modulated in direct relation to instantaneous value of the complex load $R_s(t)$, as governed by the type circuit response waveforms shown in FIG. 13.

The main desire is to achieve nearly straight line of the VDC at the storage capacitor at all times to maintain constant (not modulated) amplitude of the current provided to the gas discharge load. Otherwise, undesired light flickering will occur.

By integrating the first and second resonant circuits using a common resonant inductor, both resonant circuits interact naturally and resonantly during resonant oscillations in a stable operating mode, from the time of the first pulse after oscillation triggering. Both resonant circuit are highly integrated and clamped to the AC power line and are made to oscillate with the same oscillation frequency. For example, without presence of the first resonant circuit, the second resonant circuit starts with a "NO LOAD FREQUENCY" (see FIG. 15) and if not tuned properly, will destroy itself. The feedback and clamping arrangement provides that the SECOND RESONANT CIRCUIT starts and operates within the "SAFE OPERATING REGION", with frequency being automatically modulated according to conditions of complex load Rs(t) and lamp load RL, (see FIG. 15).

Such integration of the two resonant circuits and arrangements of feedback and clamping make the electronic ballasts operate in extremely safe manner in virtually all conditions of the lamp load. The half-bridge inverter operates without possibility of transistors' cross-conduction at any time.

Figure 16B:
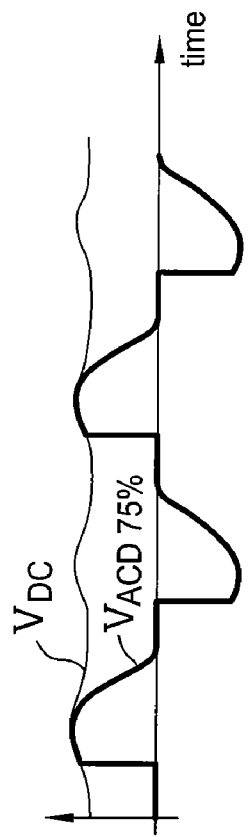

Dimming Mode—75%:

In this mode the dimmer "removes" a portion of the sine wave of the AC Voltage supplied by AC power line. FIG. 16B shows that voltage as VACD75%. FIG. 17B shows that voltage rectified as VACD75% R.

The circuit works in the same manner as in Full Mode above, except that in the 75% mode ΔV75% voltage is being added to the VACR75% in a dynamic way by operation of the embodiments described herein.

Figure 11:
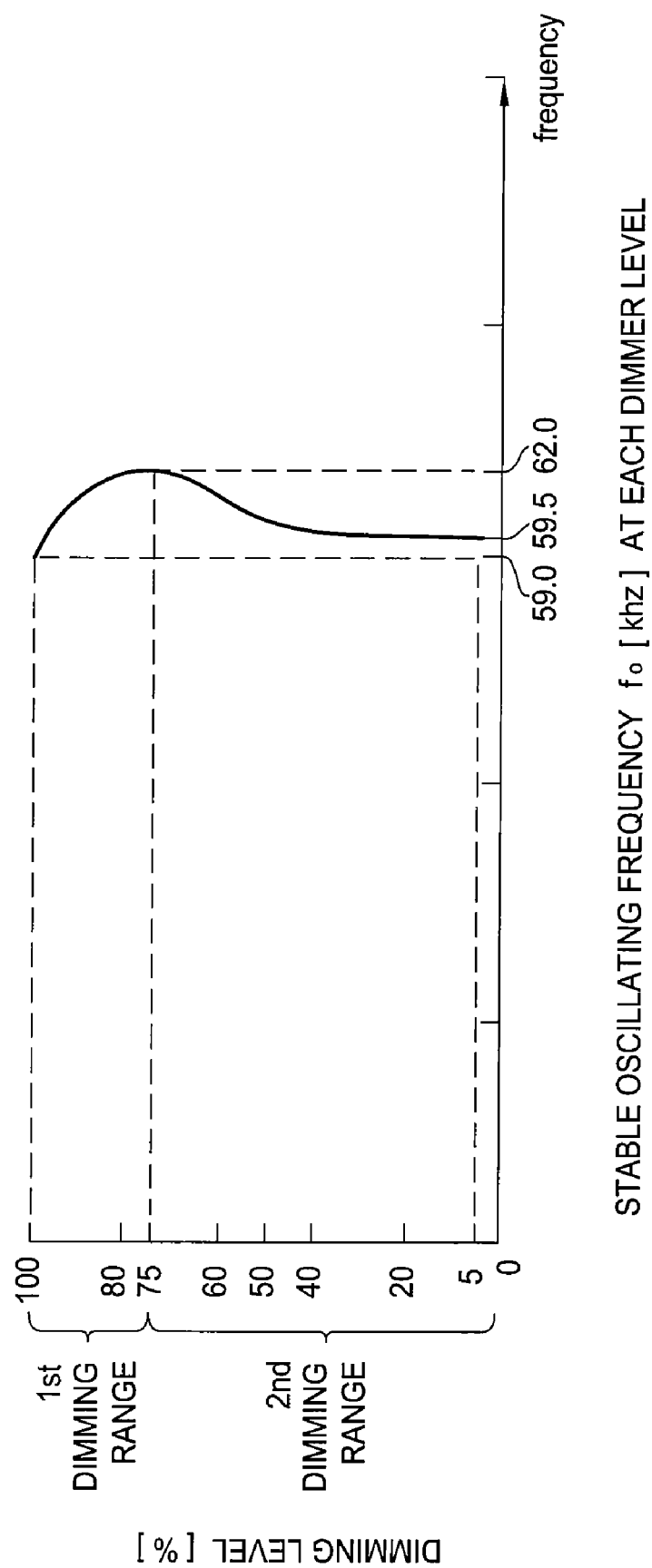
FIG. 11 depicts a graphical representation of oscillation frequency as a function of dimmer level useful in understanding the various embodiments.

The circuitry automatically adjusts and self-modulates its oscillation frequency and a center frequency will automatically adjusts itself within the SAFE OPERATING REGION, see FIGS. 11 and 15. The feedback and clamping automatically self-adjust according to the VACD75% magnitude in very dynamic way to assure lowered light output of the lamp load.

Figure 16C:
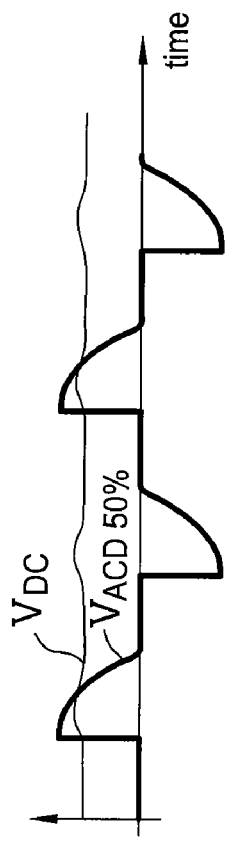

Dimming Mode—50%:

In this mode the dimmer "removes" half of the sine wave of the AC Voltage supplied by AC power line. FIG. 16C shows that voltage as VACD50%. FIG. 17C shows that voltage rectified as VACD50% R.

The circuit works in the same manner as in 75% Mode above. In this mode, the ΔV50% voltage is being added to the VACR50% in a dynamic way by operation of the circuit of this invention.

Circuit will automatically adjust and self-modulate its oscillation frequency and a center frequency will automatically adjusts itself within the SAFE OPERATING REGION, see FIGS. 11 and 15. The feedback and clamping will automatically self-adjust according to the VACD50% magnitude in very dynamic way to assure lowered light output of the lamp load.

Figure 16D:
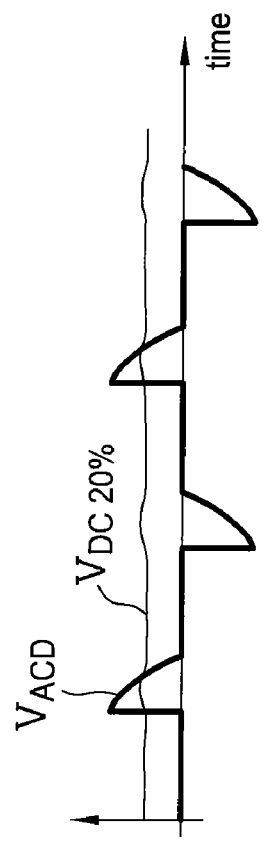

Dimming Mode—20%:

In this mode the dimmer "removes" half of the sine wave of the AC Voltage supplied by AC power line. FIG. 16D shows that voltage as VACD20%. FIG. 17D shows that voltage rectified as VACD20% R.

The circuit works in the same manner as in 50% Mode above. In this mode, the ΔV20% voltage is being added to the VACR20% in a dynamic way by operation of the circuit of this invention.

Circuit will automatically adjust and self-modulate its oscillation frequency and a center frequency will automatically adjusts itself within the SAFE OPERATING REGION, see FIGS. 11 and 15. The feedback and clamping will automatically self-adjust according to the VACD20% magnitude in very dynamic way to assure lowered light output of the lamp load.

In one embodiment, the component values for the circuitry of FIG. 1 are selected as shown in Table 1. Other component selections will be readily apparent to those skilled in the art and informed by the teachings herein.

TABLE 1

| Description | Reference Designation |
|---|---|
| 22 Ohm NTC THERMISTOR | NTC |
| 10 n/400 V CAPACITOR | ACCL1 |
| 5n6, 1000 V CAPACITOR | DCF1 |
| 390 nF, 100 V, CL23B, Met. Polyester Capacitor | ACLC2 |
| HER 157 DIODE | D1 |
| HER 157 DIODE | D2 |
| HER 157 DIODE | D3 |
| HER 157 DIODE | D4 |
| 22uF, 200 V Electr. Cap, 8-10K Hours @105 C. | CS1 |
| BLD123DL TRANSISTOR | Q11 |
| BLD123DL TRANSISTOR | Q22 |
| 0.95 mH, Inductor | LR1 |
| 4n7, 1000 V CAPACITOR | CR1 |
| 1n0 1500 V CAPACITOR | CR2 |
| 18 W FLUORESCENT LIGHT SOURCE | LOAD1 |

Figure 2:
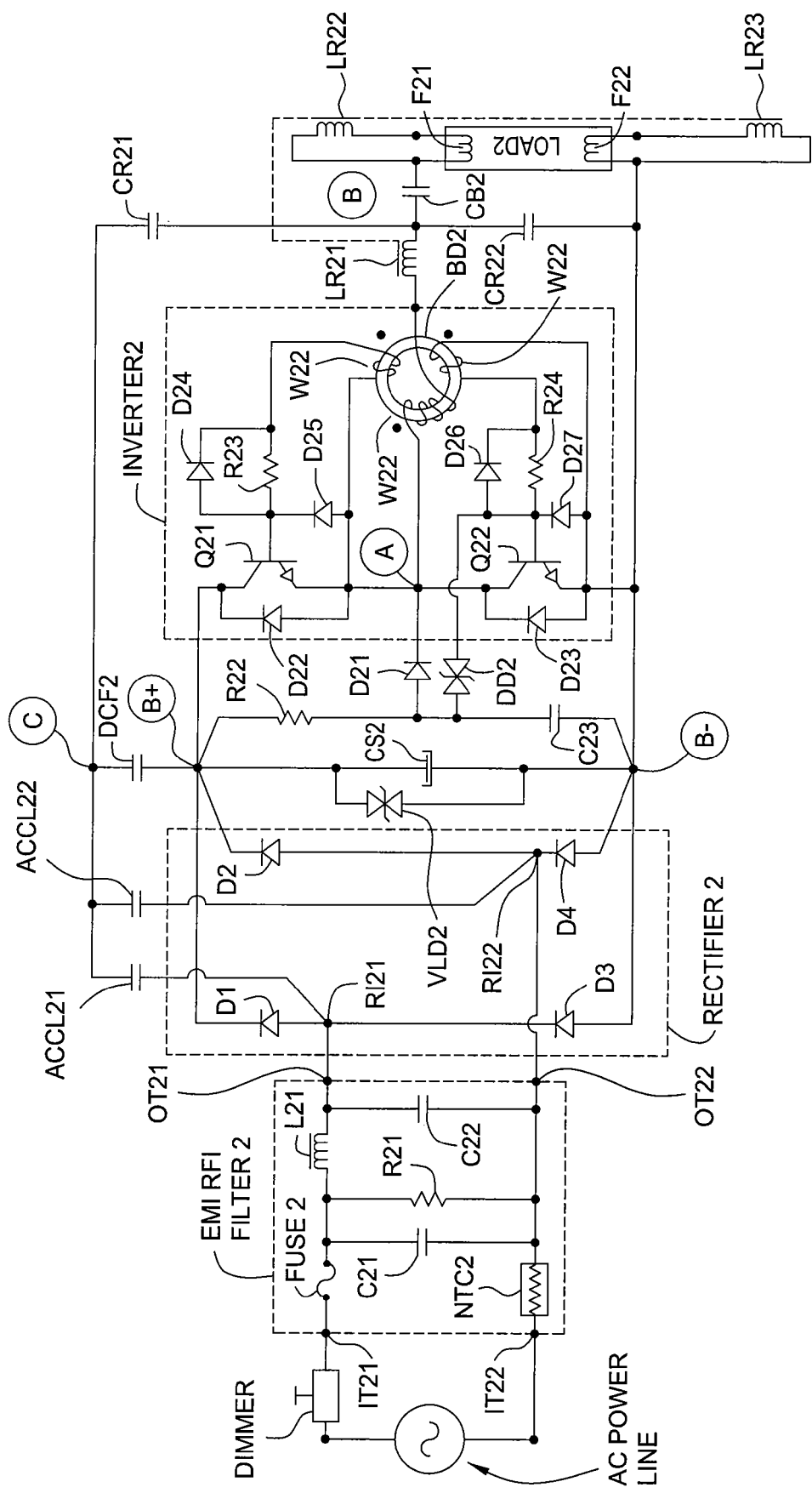
FIGS. 2-8 depict block diagrams of circuits including electronic ballast according to alternate embodiments.

FIG. 2 depicts a block diagram of a circuit including electronic ballast according to alternate embodiments. Specifically, the circuit of FIG. 2 is similar to that of FIG. 1, except that the circuit of FIG. 2 includes additional details and several modifications, as noted below.

The half-bridge inverter 125 is now shown with saturable base drive transformer BD2 as a switching drive transformer to make the transistors Q21 and Q22 switch in alternate mode. The winding W21 is resonant inductor current sensing winding connected in series with the resonant inductor LR21. The drive transformer has two secondary windings W22, W23 wound on a torroidal ferrite core.

Each of the transistors is equipped with a set of drive stability components, as follows: a base resistor R23 is connected in series with winding W22 and base-emitter junction of the transistor Q21; a diode D22 is connected across collector-emitter junction of the transistor Q21; a diode D25 is connected across base-emitter junction of the transistor Q21; and (iv) a diode D24 is connected across the base resistor R23. The transistor Q22 is equipped with the same set of drive stability components as the transistor Q21.

The resonant inductor LR2 has two secondary windings LR22 and LR23 connected to respective filaments F21 and F22 of gas discharge LOAD2.

A trigger circuit made with resistor R22, Capacitor C23, diode D21, and diac DD2 is connected in a known manner to trigger the oscillations of the inverter.

A voltage limiting device VLD2 is connected across the energy storage capacitor CS2.

Figure 3:
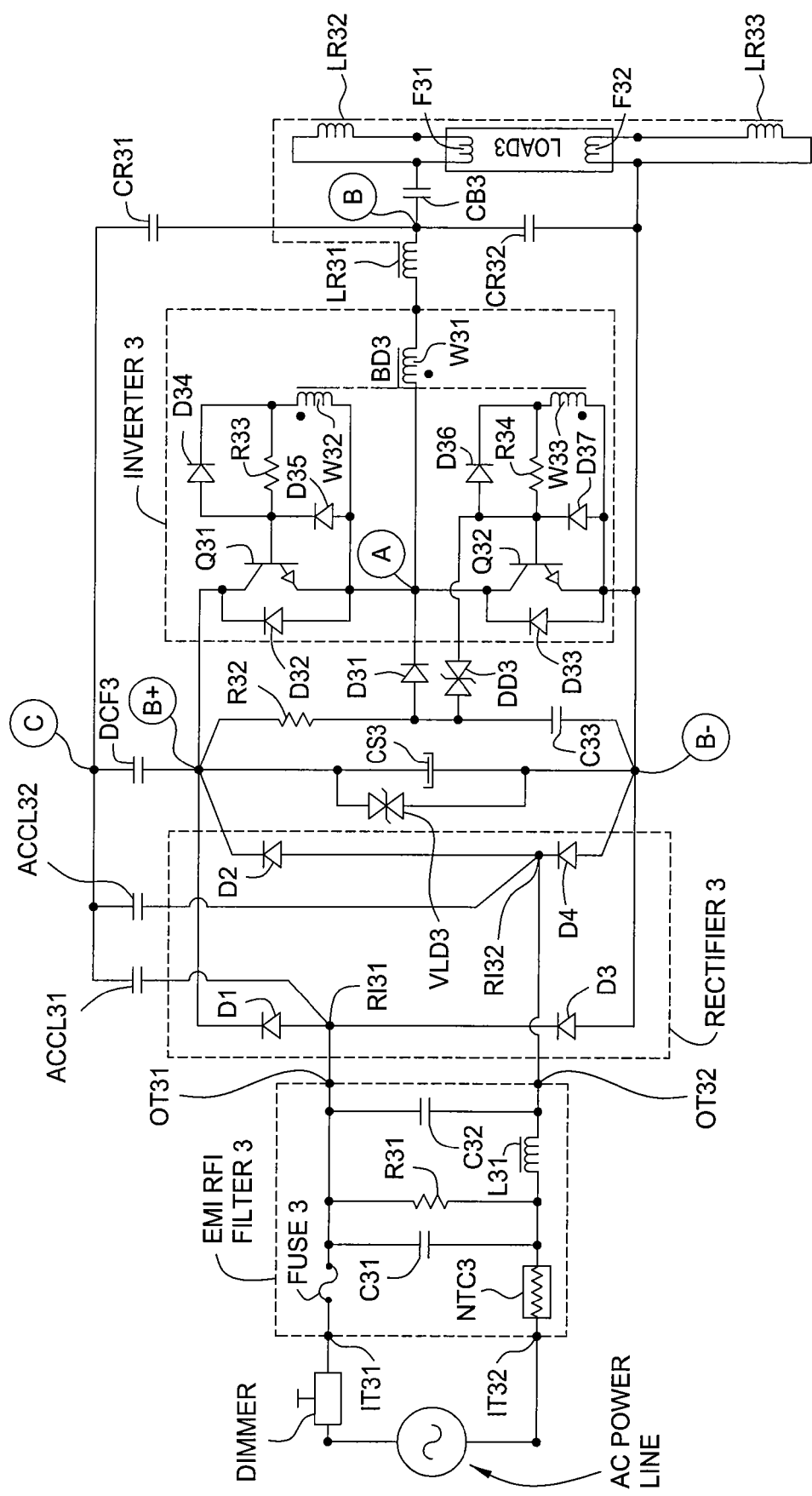

FIG. 3 depicts a block diagram of a circuit including electronic ballast according to alternate embodiments. Specifically, the circuit of FIG. 3 is similar to that of FIG. 1, except that the circuit of FIG. 3 includes additional details and several modifications, as noted below.

The saturable base drive transformer is here replaced with non-saturable base drive transformer BD3.

The primary winding is connected in series with the resonant inductor LR31, and the two secondary base drive windings W32 and W33 are coupled to base-emitter junctions of the transistors Q31 and Q32, respectively.

Figure 4:
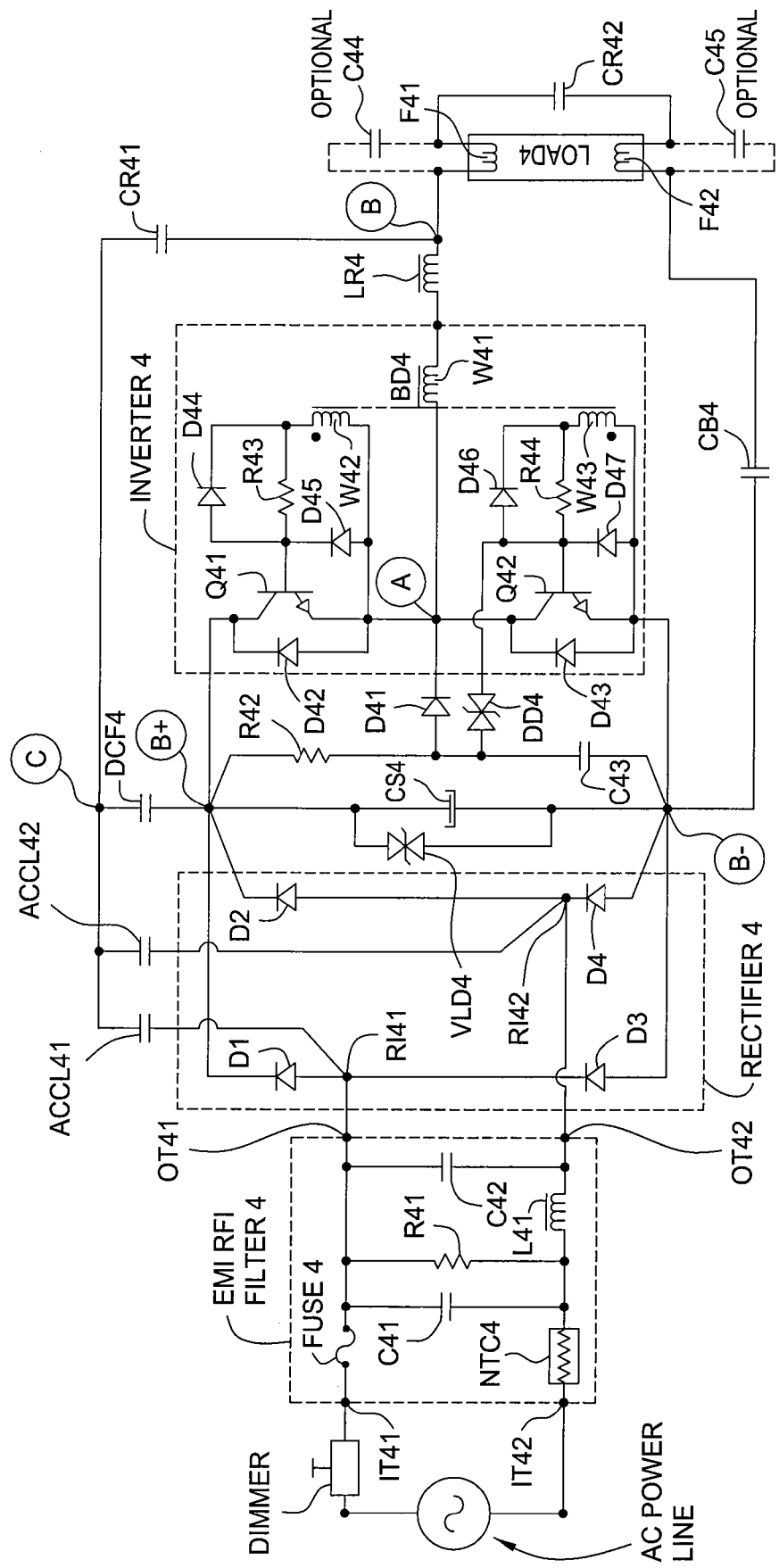

FIG. 4 depicts a block diagram of a circuit including electronic ballast according to alternate embodiments. Specifically, the circuit of FIG. 4 is similar to that of FIG. 1, except that the circuit of FIG. 4 includes additional details and several modifications, as noted below.

The resonant capacitor CR42 is now connected on the opposite side of the LOAD 4, so the current flowing through this capacitor CR42 now flows through both filaments F41 and F42.

The base drive transformer BD4 is a non-saturating type as in FIG. 3.

Figure 5:
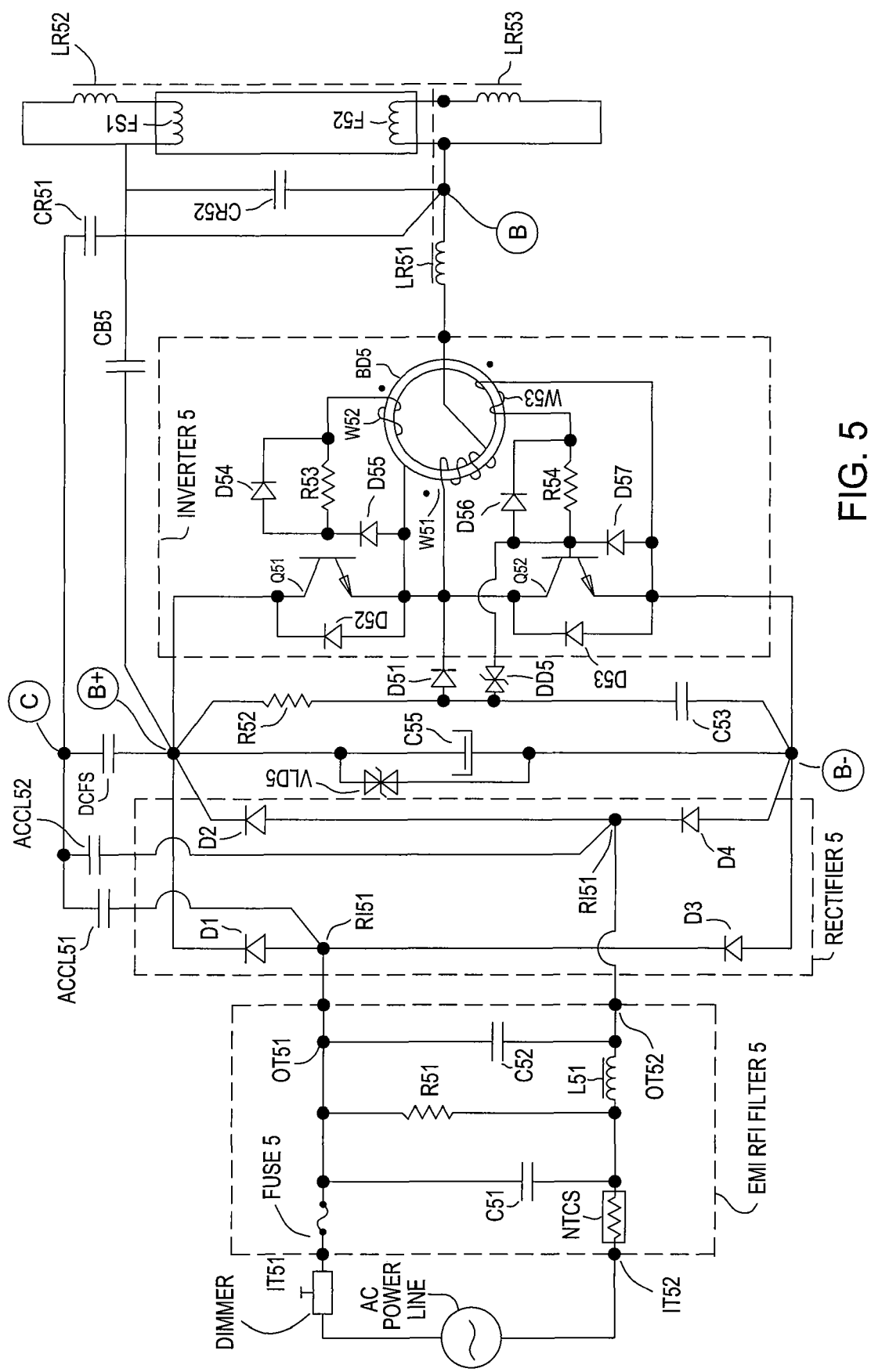

FIG. 5 depicts a block diagram of a circuit including electronic ballast according to alternate embodiments. Specifically, the circuit of FIG. 5 is similar to that of FIG. 1, except that the circuit of FIG. 5 includes additional details and several modifications, as noted below.

In this embodiment, the second resonant circuit includes a resonant inductor LR51, resonant capacitor CR52, LOAD5, and DC blocking capacitor CB5. This resonant circuit is now connected between junction A and DC input terminal B+, instead to terminal B−.

The base drive transformer BD6 is a saturable type, as in the embodiment of FIG. 2.

The filaments F51 and F52 are powered from the resonant inductor secondary windings LR52 and LR53, respectively.

Figure 6:
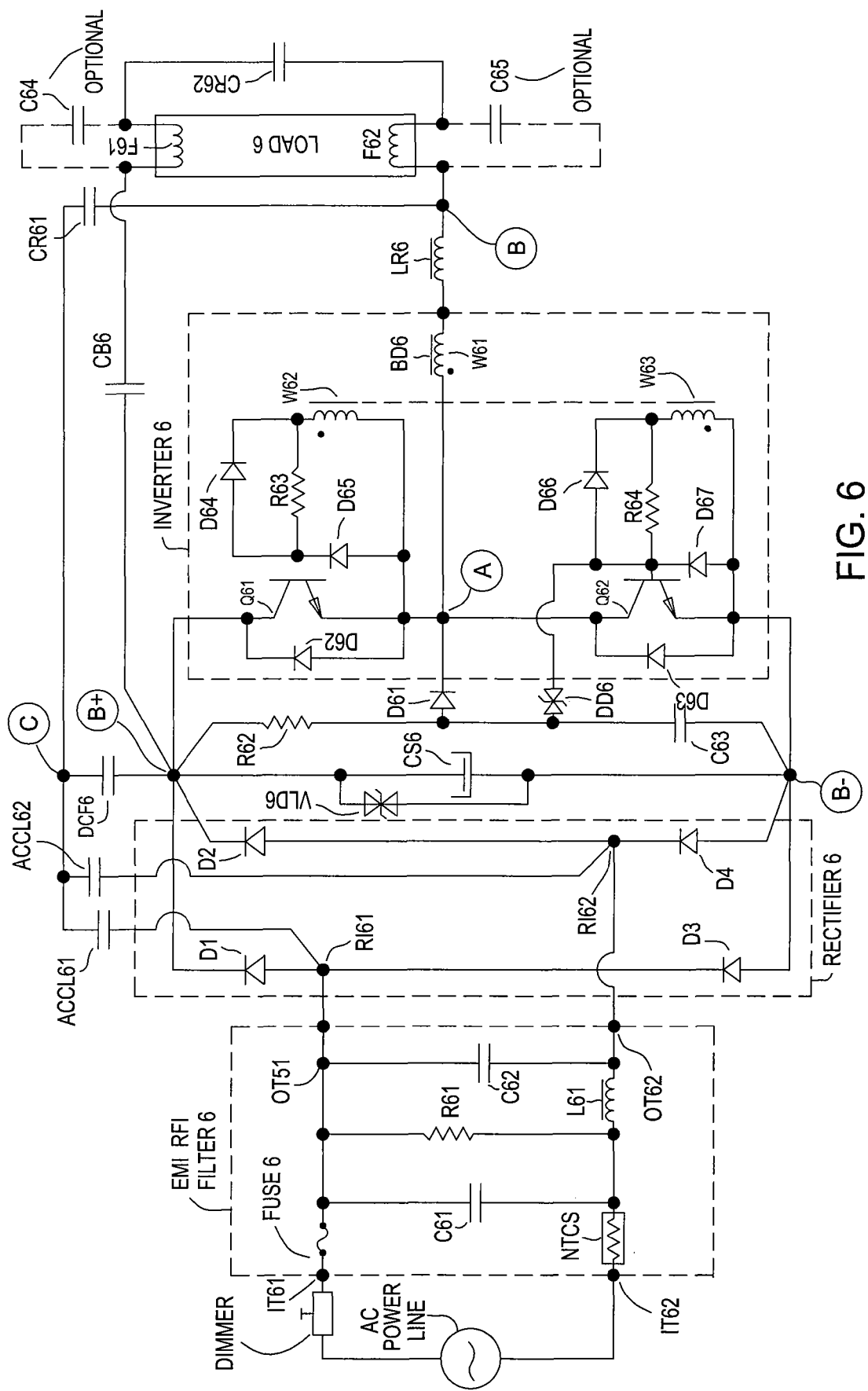

FIG. 6 depicts a block diagram of a circuit including electronic ballast according to alternate embodiments. Specifically, the circuit of FIG. 6 is similar to that of FIG. 1, except that the circuit of FIG. 6 includes additional details and several modifications, as noted below.

In this embodiment, the second resonant circuit includes a resonant inductor LR51, resonant capacitor CR52, LOAD5, and DC blocking capacitor CB5. This resonant circuit is now connected between junction A and DC input terminal B+, instead to terminal B−.

The base drive transformer BD6 is a non-saturable type, as in FIG. 3.

The filaments F61 and F62 are powered by the current of the resonant capacitor CR62.

Figure 7:
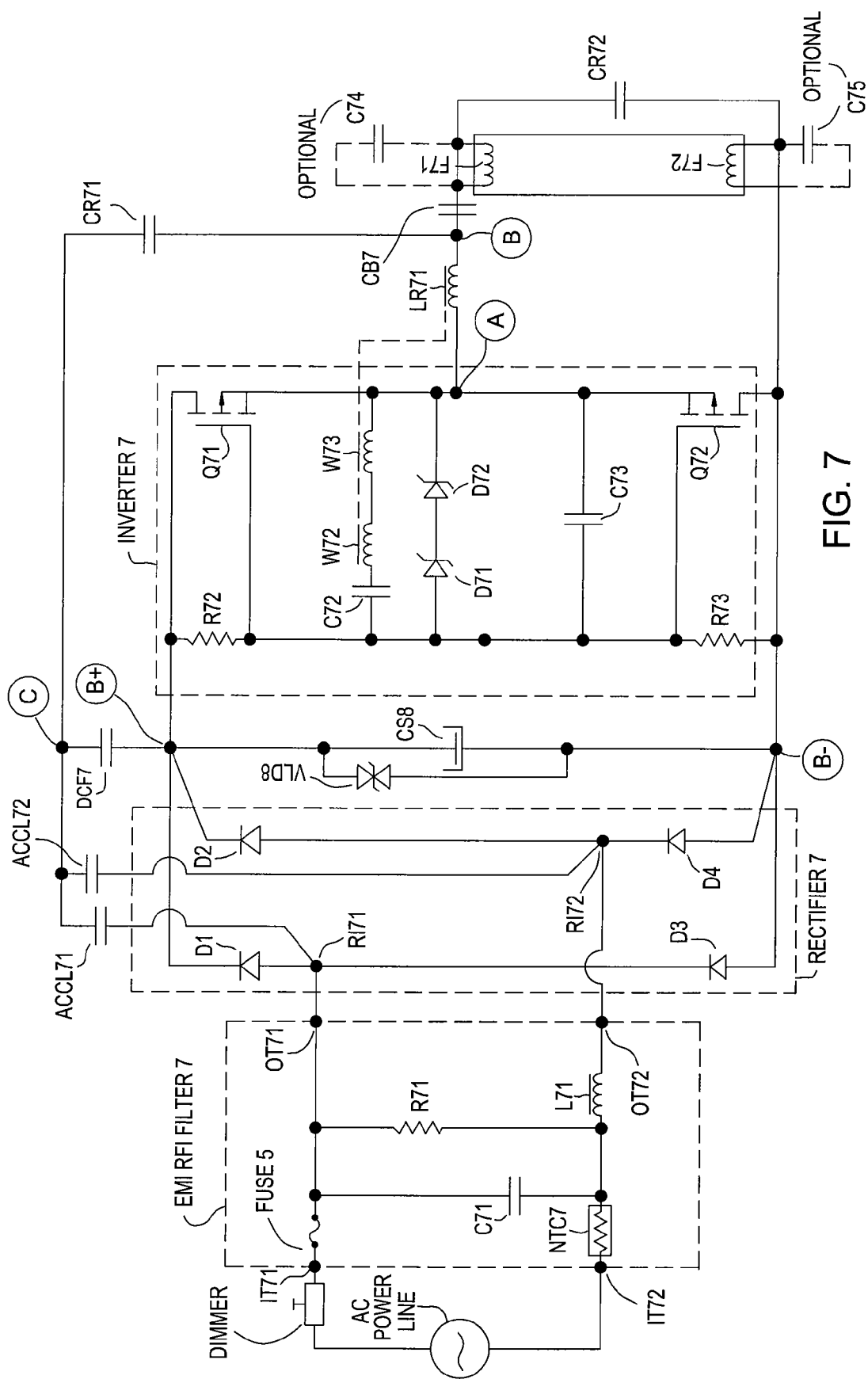

FIG. 7 depicts a block diagram of a circuit including electronic ballast according to alternate embodiments. Specifically, the circuit of FIG. 7 is similar to that of FIG. 1, except that the circuit of FIG. 7 includes additional details and several modifications, as noted below.

In this embodiment, the inverter 125 includes a complimentary pair of P- and N-type MOS transistors Q71 and Q72, and is self oscillating type. The gate drive signals delivered alternately to gate of each of the transistors is supplied by secondary winding of the resonant inductor LR7.

Figure 8:
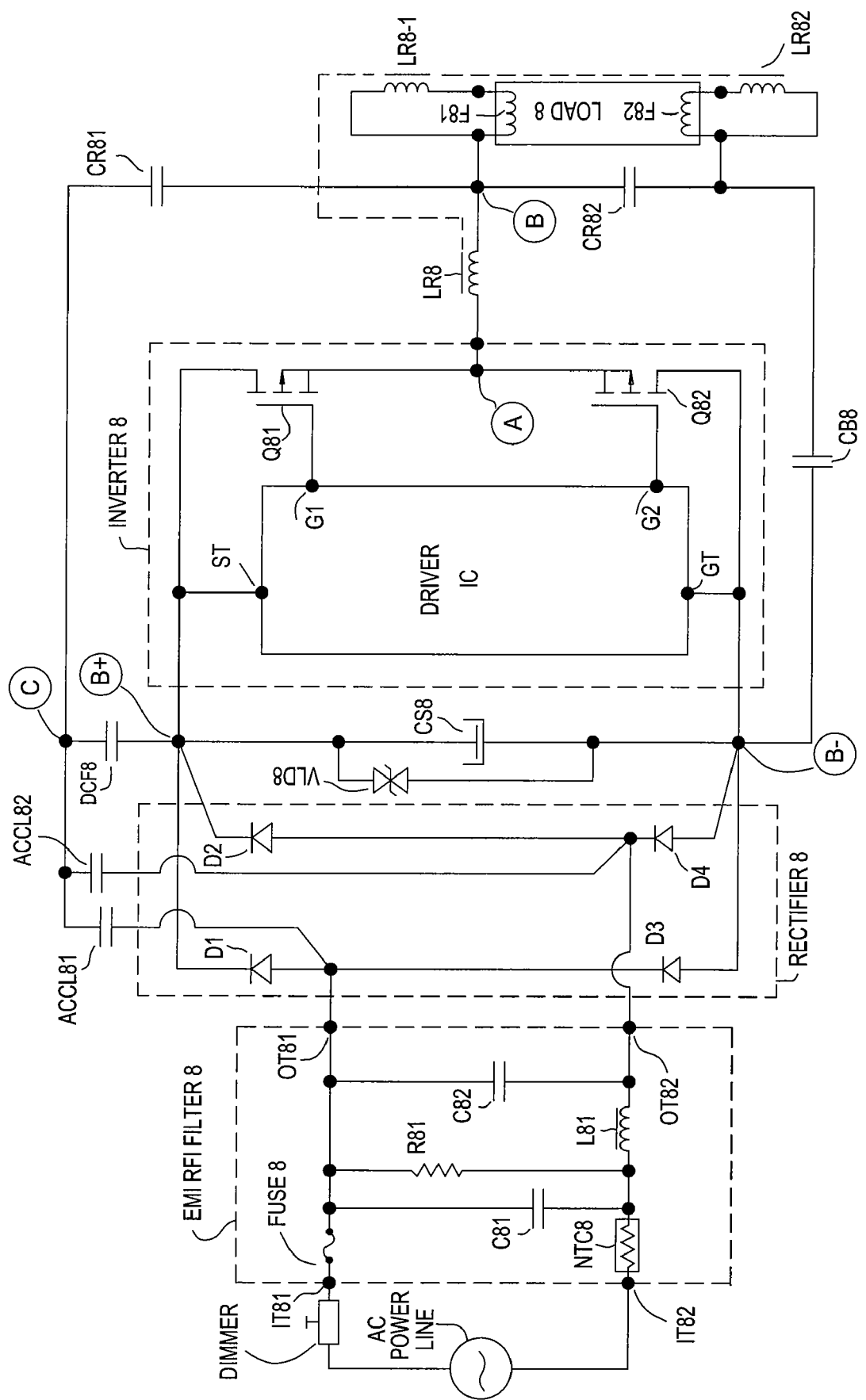
Figure 9C:
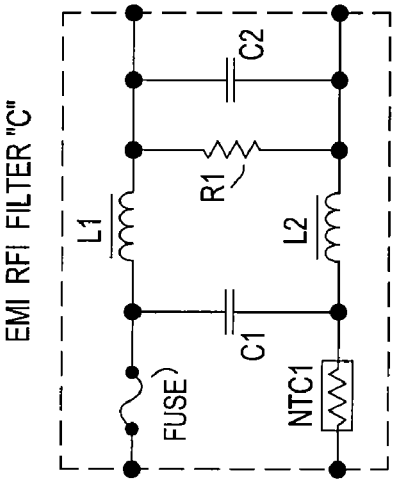
FIG. 9 depicts alternate embodiments of an EMI/RFI filter circuit suitable for use in the embodiments of FIGS. 1-8.
Figure 9F:
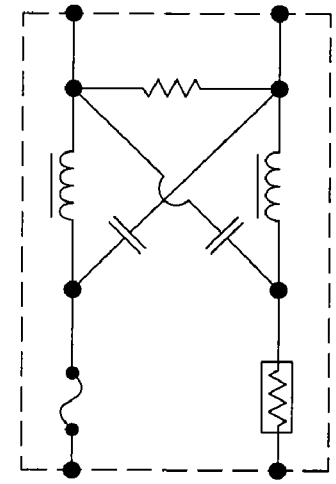
Figure 9B:
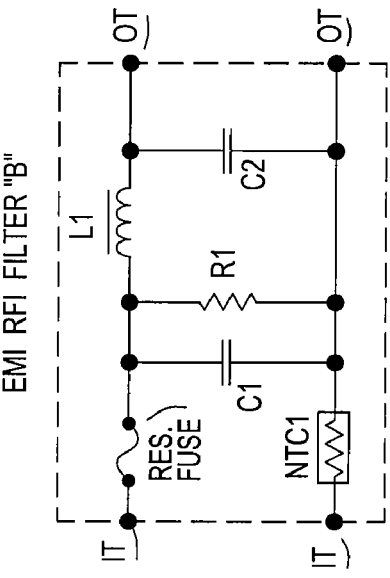
Figure 9E:
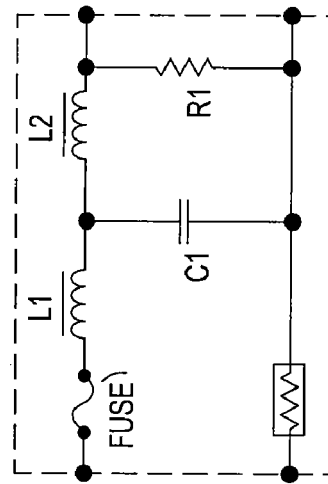
Figure 9A:
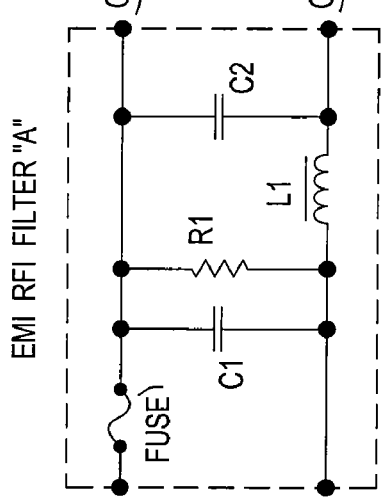
Figure 9D:
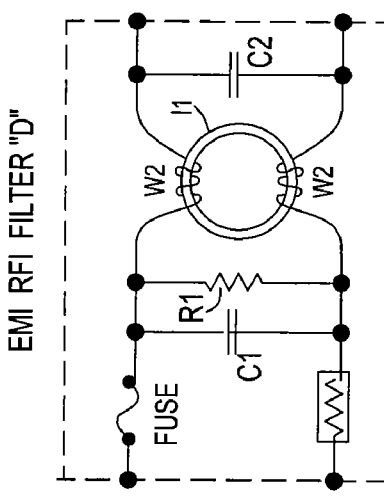
Figure 10A:
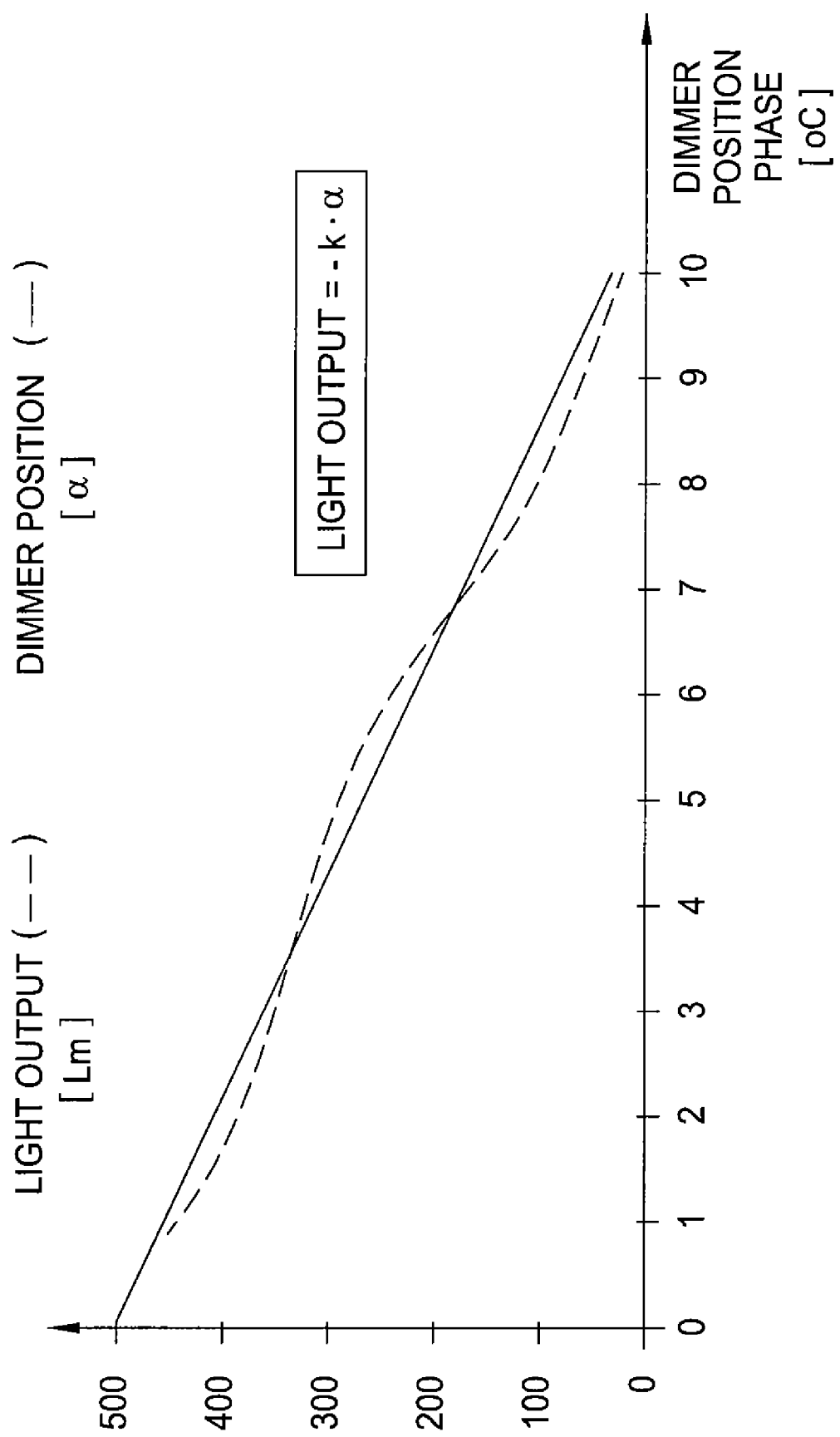
FIG. 10 depicts a graphical representation of light output as a function of dimmer position useful in understanding the various embodiments.
Figure 10B:
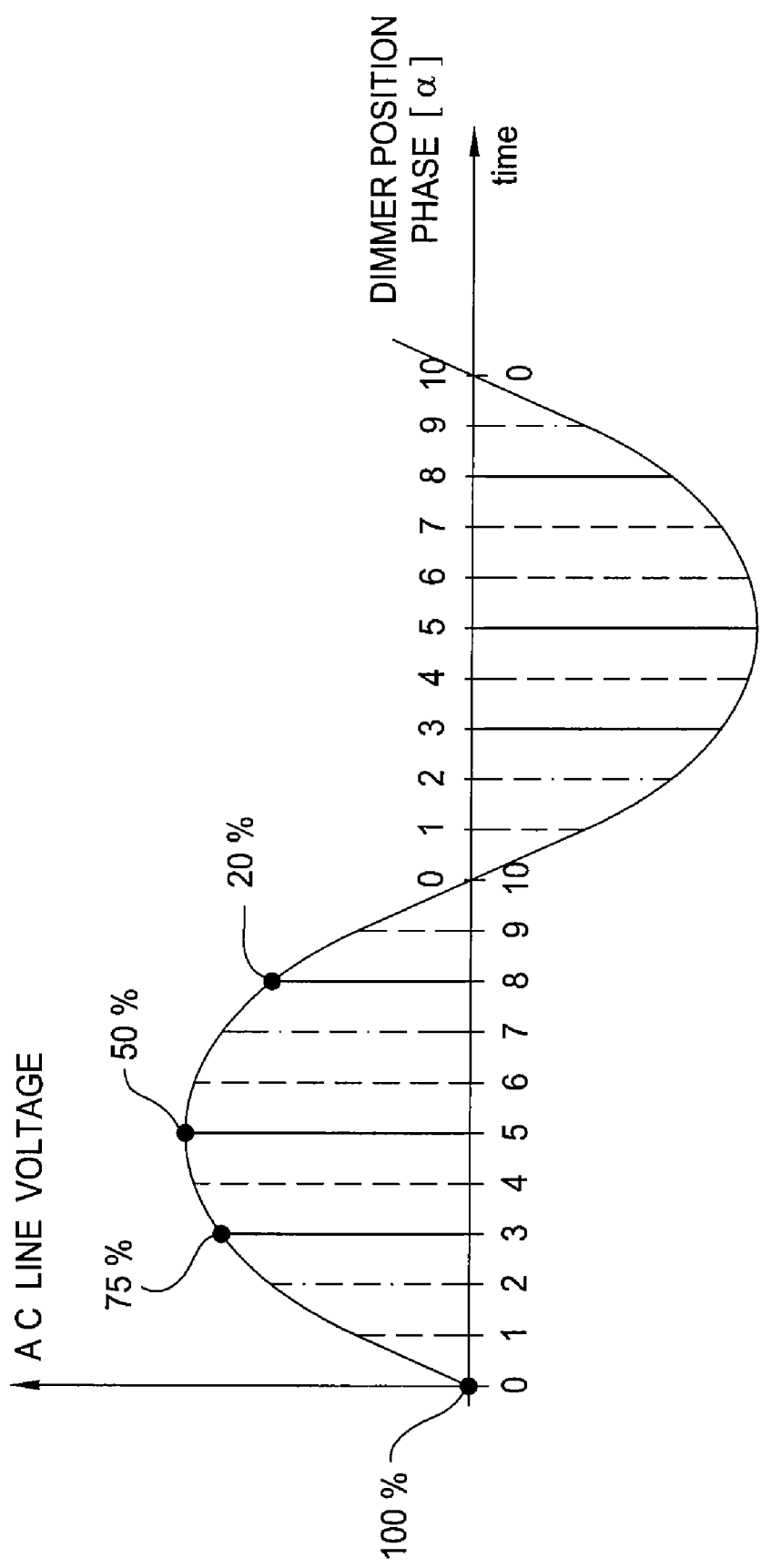

FIG. 8 depicts a block diagram of a circuit including electronic ballast according to alternate embodiments. Specifically, the circuit of FIG. 8 is similar to that of FIG. 1, except that the circuit of FIG. 8 includes additional details and several modifications, as noted below.

In this embodiment, the inverter 125 includes with a pair of N type MOS transistors Q81 and Q82. The gate drive signals delivered alternately to the gate of each transistor is provided by an integrated circuit DRIVER IC. The IC can be a standard half-bridge driver or custom made to accommodate the oscillation of the two resonant circuits.

It will be appreciated by those skilled in the art that the circuits, devices, topologies and methodologies described herein provide substantial stability of critical performance parameters during all modes of operation from full power to deep dimming with use of an ordinary phase cut dimmer. The dimmer type can be a leading edge phase cut or a trailing edge phase cut type. Further, the dimmer can be made with ordinary triac or other semiconductor type device like IGBT or MOSFET. Operation of the circuit is the same with all types of dimmers.

The feedback and clamping arrangement is essential in safe and reliable operation of the circuit especially in dimming modes. The resonant current circulated within the common resonant inductor is minimized to achieve highest efficiency of the circuit and immunity to high ambient temperatures in which the device must operate safely and reliably.

It will be appreciated that embodiment of the invention are implementable with relatively low parts count and are easily adaptable to all power line voltages and load types, repeatable in manufacturing process, and inexpensive.

It will be understood that all other types of resonant oscillatory circuits, such as the self-oscillating or driven by an IC's, half-bridge, or full-bridge, fly-back, forward or Class E type—can be used in presently described invention.

Various embodiments of the invention have been disclosed and described herein. For example, in one embodiment an electronic ballast circuit adapted to operate a gas discharge load from low frequency AC power line comprises a filter circuit having a first and a second input terminals coupled to the AC power line, and the filter having a first and a second output terminals; a rectifier circuit having a first rectifier input terminal connected to the first output terminal of the filter circuit, and a second rectifier input terminal connected to the second output terminal of the filter circuit; and the rectifier circuit having a pair of DC output terminals (B+, B−); an energy storage capacitor connected to the DC output terminals (B+, B−); a self-oscillating resonant inverter circuit coupled to the DC output terminals, wherein the self-oscillating resonant inverter circuit comprises (i) a pair of semiconductor switching devices coupled to the DC output terminals and interconnected at an inverter output junction A; (ii) a first and a second resonant circuits having a first and a second resonant capacitors connected at a resonant junction B, and one common resonant inductor coupled between the inverter output junction A and the resonant junction B; (iii) the second resonant capacitor coupled to DC terminal B− and to the gas discharge load; (iv) the first resonant capacitor coupled to a feedback junction C; and (v) a drive transformer coupled in series with the resonant inductor and provides switching signals to the pair of semiconductor switching devices to effectively sustain the oscillations of the resonant inverter. This embodiment also comprises a DC feedback capacitor connected to the DC terminal B+ and to the feedback junction C; a first AC clamping capacitor connected to the first rectifier input terminal and to the feedback junction C; and a second AC clamping capacitor connected to the second rectifier input terminal and to the feedback junction C.

Another embodiment discussed above with respect to FIGS. 5-6 comprises an electronic ballast circuit adapted to operate a gas discharge load from a low frequency AC power line, comprising: a filter circuit having a first and a second input terminals coupled to the AC power line, and having a first and a second output terminals; a rectifier circuit having a first rectifier input terminal connected to the first output terminal of the filter circuit, and a second rectifier input terminal connected to the second output terminal of the filter circuit; and the rectifier circuit having a pair of DC output terminals (B+, B−); an energy storage capacitor connected to the DC output terminals (B+, B−); a self-oscillating resonant inverter circuit coupled to the DC output terminals, comprising: (i) a pair of semiconductor switching devices coupled to the DC output terminals and interconnected at an inverter output junction A; (ii) a first and a second resonant circuits having a first and a second resonant capacitors connected at a resonant junction B, and one common resonant inductor coupled between the inverter output junction A and the resonant junction B; (iii) the first resonant capacitor coupled to a feedback junction C; (iv) the second resonant capacitor coupled to DC terminal B+ and to the gas discharge load; and (v) a drive transformer coupled in series with the resonant inductor and provides switching signals to the pair of semiconductor switching devices to effectively sustain the oscillations of the resonant inverter. The embodiment also comprises a DC feedback capacitor connected to the DC terminal B+ and to the feedback junction C; a first AC clamping capacitor connected to the first rectifier input terminal and to the feedback junction C; and a second AC clamping capacitor connected to the second rectifier input terminal and to the feedback junction C.

Another embodiment discussed above with respect to FIG. 7 comprises an electronic ballast circuit adapted to operate a gas discharge load from low frequency AC power line, comprising: a filter circuit having a first and a second input terminals coupled to the AC power line, and the filter having a first and a second output terminals; a rectifier circuit having a first rectifier input terminal connected to the first output terminal of the filter circuit, and a second rectifier input terminal connected to the second output terminal of the filter circuit; and the rectifier circuit having a pair of DC output terminals (B+, B−); an energy storage capacitor connected to the DC output terminals (B+, B−) for storage; a self-oscillating resonant inverter circuit coupled to the DC output terminals, comprising: (i) a pair of semiconductor switching devices coupled to the DC output terminals and interconnected at an inverter output junction A; (ii) a first and a second resonant circuits having a first and a second resonant capacitors connected at a resonant junction B, and one common resonant inductor coupled between the inverter output junction A and the resonant junction B; (iii) the second resonant capacitor coupled to DC terminal B+ and to the gas discharge load; (iv) the first resonant capacitor coupled to a feedback junction C; and (v) a drive circuit employing two secondary windings of the resonant inductor to provide switching signals to the pair of semiconductor switching devices to effectively sustain the oscillations of the resonant inverter. The embodiment also comprises a DC feedback capacitor connected to the DC terminal B+ and to the feedback junction C; a first AC clamping capacitor connected to the first rectifier input terminal and to the feedback junction C; and a second AC clamping capacitor connected to the second rectifier input terminal and to the feedback junction C.

Another embodiment discussed above with respect to FIG. 8 comprises an electronic ballast circuit adapted to operate a gas discharge load from low frequency AC power line, comprising: a filter circuit having a first and a second input terminals coupled to the AC power line, and the filter having a first and a second output terminals; a rectifier circuit having a first rectifier input terminal connected to the first output terminal of the filter circuit, and a second rectifier input terminal connected to the second output terminal of the filter circuit; and the rectifier circuit having a pair of DC output terminals (B+, B−); an energy storage capacitor connected to the DC output terminals (B+, B−) for storage; a driven oscillating resonant inverter circuit coupled to the DC output terminals, comprising: (i) a pair of semiconductor switching devices coupled to the DC output terminals and interconnected at an inverter output junction A; (ii) a first and a second resonant circuits having a first and a second resonant capacitors connected at a resonant junction B, and one common resonant inductor coupled between the inverter output junction A and the resonant junction B; (iii) the second resonant capacitor coupled to DC terminal B+ and to the gas discharge load; (iv) the first resonant capacitor coupled to a feedback junction C; and (v) an integrated drive circuit coupled to the DC terminals (B+, B−) and having at least two drive output terminals to provide switching signals to the pair of semiconductor switching devices to effectively produce the oscillations of the resonant inverter. The embodiment also comprises a DC feedback capacitor connected to the DC terminal B+ and to the feedback junction C; a first AC clamping capacitor connected to the first rectifier input terminal and to the feedback junction C; and a second AC clamping capacitor connected to the second rectifier input terminal and to the feedback junction C. This embodiment and the other embodiments optionally utilize a driver integrated circuit (IC) to drive the oscillating resonant inverter.

Another embodiment of an electronic ballast circuit capable of receiving power from low frequency AC power line voltage source regulated by a dimmer and adapted to operate gas discharge load with regulated light output comprises (i) a high frequency oscillator equipped with an inverter coupled to two series-resonant circuits having one common resonant inductor, and (ii) a clamping and feedback circuit coupled to the high frequency oscillator and to low frequency AC power line and operating with the oscillation frequency increased during operation of the gas discharge load with the dimmer at any light output level lower then a maximum light output.

Another embodiment of an electronic ballast circuit capable of receiving power from low frequency AC power line voltage source regulated by a dimmer and adapted to operate gas discharge load, the electronic ballast comprises an oscillator circuit comprised of two integrated and synchronized resonant circuits having two resonant capacitors and one common resonant inductor, wherein one resonant circuit is used to operate the gas discharge load and the other resonant circuit is to provide for a feedback of energy and a clamping of the oscillator circuit to the AC power line in order to perform dimming function of the gas discharge load by the dimmer.

Another embodiment of an electronic ballast circuit capable of receiving power from low frequency AC power line voltage source regulated by a dimmer and adopted to operate gas discharge load with regulated light output, the electronic ballast comprises an input circuit for connection to the dimmer-regulated low frequency AC power line voltage source; a rectifier having input terminals coupled to the input circuit; and having DC output terminals coupled to energy storage capacitor; semiconductor switching devices coupled to the energy storage capacitor and interconnected at an inverter output junction A; a resonant oscillator circuit coupled to the junction A and to the DC output terminals; the resonant oscillator operable to draw a pulsating current from the DC output terminals, comprising: (i) a first resonant load circuit having a resonant inductor and a first resonant capacitor connected in series at a junction B, and having gas discharge load coupled effectively in parallel to the first resonant capacitor; (ii) a second resonant feedback circuit having the resonant inductor, a second resonant capacitor, and a DC feedback capacitor connected in series and operable to provide a pulsating DC voltage at the DC output terminals; and (iii) an AC clamping circuit having a first and a second clamping capacitors coupled to the input terminals of the rectifier and to the DC feedback capacitor.

In a further embodiment, any of the above-described embodiments further includes a Negative Temperature Coefficient (NTC) resistor is used in at least one lead of AC power supply series. Such use of NTC provides self-adjusting resistance in order to provide ability to use multiple dimmers on the same branch of the AC power line without interactions between lamps and independent dimming without flickering of the lamps operated by each dimmer. The self-adjusting resistance, according to its natural characteristic, is dependent directly on temperature of the NTC. The temperature of NTC, however, is dependent on the RMS current drawn by the operated lamp from AC power line source. It is to the advantage of operational performance to have higher NTC resistance at lower RMS current drawn by the operated lamp at full power (at 100%) when the power factor is high, and it is also to the advantage of the dimming performance to have lower NTC resistance at higher RMS current drawn by the operated lamp in dimming mode (for example at 50%) when the power factor is low.

It is believed that the present invention and its several attendant advantages and features will be understood from the proceeding description. However, without departing from the spirit of the invention, changes may be made in its form and in the construction and interrelationships of its components parts, the form herein presented merely representing the presently preferred embodiments.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. Apparatus for powering a gas discharge load, comprising:
   a bridge rectifier, for generating a rectified voltage signal across a pair of output terminals in response to a received AC signal;
   a storage capacitor, coupled across the bridge rectifier output terminals, for storing energy provided by the rectified voltage signal;
   an inverter, coupled across the bridge rectifier, for generating an alternating voltage signal at an output terminal;
   an inductor, coupled between the inverter output terminal and a load terminal;
   a first resonant circuit including the inductor, for providing a DC feedback signal to the storage capacitor, the DC feedback signal being AC clamped to the received AC signal; and
   a second resonant circuit including the inductor, for supplying a load current to the load terminal; wherein the first resonant circuit adapts the DC feedback signal in response to changes in the received AC signal.

2. The apparatus of claim 1, wherein the first resonant circuit further comprises:
   a DC feedback capacitor, for providing a charging voltage to the storage capacitor;
   a smaller AC clamping capacitor for providing a high voltage to the bridge rectifier input during a relatively high frequency resonant oscillation mode; and
   a larger AC clamping capacitor for providing a high current to the bridge rectifier input during the relatively high frequency resonant oscillation mode.

3. The apparatus of claim 1, wherein the larger AC clamping capacitor is selected to be approximately 390 nF and the smaller is selected to be approximately 1.0 nF.

4. The apparatus of claim 1, further comprising:
a filter circuit, for filtering the AC signal provided to the bridge rectifier.

5. The apparatus of claim 1, wherein the inverter comprises at least one semiconductive switching device.

6. The apparatus of claim 5, further comprising:
a drive transformer coupled in series with the resonant inductor and providing switching signals to the pair of semiconductor switching devices to sustain the oscillations of the resonant inverter.

7. The apparatus of claim 6, wherein the drive transformer comprises one of a saturable ferrite core and a non-saturable ferrite core.

8. The apparatus of claim 1, wherein the gas discharge load comprises one of a fluorescent light source equipped with heatable filaments and an electrodeless fluorescent light source.

9. The apparatus of claim 1, wherein the inverter comprises a complimentary pair of semiconductive switching transistors connected in one of a half-bridge configuration and a push-pull configuration.

10. The apparatus of claim 1, further comprising a voltage limiting device connected in parallel with the storage capacitor.

11. An electronic ballast capable of receiving power from low frequency AC power line voltage source regulated by a dimmer and adapted to operate gas discharge load with regulated light output, the electronic ballast comprising:
(i) a high frequency oscillator equipped with an inverter coupled to two series-resonant circuits having one common resonant inductor, and
(ii) a clamping and feedback circuit coupled to the high frequency oscillator and to low frequency AC power line and operating with the oscillation frequency increased during operation of the gas discharge load with the dimmer at any light output level lower then a maximum light output.

12. An electronic ballast circuit capable of receiving power from low frequency AC power line voltage source regulated by a dimmer and adapted to operate gas discharge load, the electronic ballast comprising:
an oscillator circuit comprised of two integrated and synchronized resonant circuits having two resonant capacitors and one common resonant inductor, wherein one resonant circuit is used to operate the gas discharge load and the other resonant circuit is to provide for a feedback of energy and a clamping of the oscillator circuit to the AC power line in order to perform dimming function of the gas discharge load by the dimmer.

13. An electronic ballast capable of receiving power from low frequency AC power line voltage source regulated by a dimmer and adopted to operate gas discharge load with regulated light output, the electronic ballast comprising:
an input circuit for connection to the dimmer-regulated low frequency AC power line voltage source;
a rectifier having input terminals coupled to the input circuit; and having DC output terminals coupled to energy storage capacitor;
semiconductor switching devices coupled to the energy storage capacitor and interconnected at an inverter output junction A;
a resonant oscillator circuit coupled to the junction A and to the DC output terminals;
the resonant oscillator operable to draw a pulsating current from the DC output terminals, comprising:
(i) a first resonant load circuit having a resonant inductor and a first resonant capacitor connected in series at a junction B, and having gas discharge load coupled effectively in parallel to the first resonant capacitor;
(ii) a second resonant feedback circuit having the resonant inductor, a second resonant capacitor, and a DC feedback capacitor connected in series and operable to provide a pulsating DC voltage at the DC output terminals; and
(iii) an AC clamping circuit having a first and a second clamping capacitors coupled to the input terminals of the rectifier and to the DC feedback capacitor.

14. The device according to claim 13, wherein the regulated light output of the gas discharge load is in a substantially linear relation to the AC power line voltage regulated by a dimmer.

15. The device according to claim 13 wherein the filter circuit has at least one negative temperature coefficient (NTC) thermistor.

16. The device according to claim 13 wherein the input circuit has at least one inductive element.

17. The device according to claim 1 wherein the input circuit has at least one resistor.

* * * * *